United States Patent
Gu et al.

(10) Patent No.: US 11,876,382 B2
(45) Date of Patent: Jan. 16, 2024

(54) CONNECTION MANNER IDENTIFICATION METHOD, POWER SOURCING EQUIPMENT, POWERED DEVICE, AND STORAGE MEDIUM

(71) Applicant: Huawei Technologies Co., Ltd., Shenzhen (CN)

(72) Inventors: Chao Gu, Nanjing (CN); Jian Xiang, Nanjing (CN); Qing Lu, Nanjing (CN); Guirong Ji, Shenzhen (CN); Shiyong Fu, Shenzhen (CN); Changxin Yao, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 299 days.

(21) Appl. No.: 17/360,630

(22) Filed: Jun. 28, 2021

(65) Prior Publication Data

US 2021/0408802 A1    Dec. 30, 2021

(30) Foreign Application Priority Data

Jun. 29, 2020   (CN) .......................... 202010604440.3

(51) Int. Cl.
 *H02J 4/00* (2006.01)
 *H04B 10/564* (2013.01)
 (Continued)

(52) U.S. Cl.
 CPC .............. *H02J 4/00* (2013.01); *H04B 10/564* (2013.01); *H04B 10/808* (2013.01); *G06F 1/266* (2013.01);
 (Continued)

(58) Field of Classification Search
 CPC . G06F 1/266; H02J 4/00; H04L 12/10; H04L 12/40045; H04B 10/564; H04B 10/808
 See application file for complete search history.

(56) References Cited

U.S. PATENT DOCUMENTS 9,625,965 B2   4/2017  Liu et al.
9,684,351 B2   6/2017  Liu et al.
(Continued)

FOREIGN PATENT DOCUMENTS

| CN | 104618123 A | 5/2015 |
|---|---|---|
| CN | 111262339 A | 6/2020 |
| GB | 2549953 A | 11/2017 |

OTHER PUBLICATIONS

Zhang Yue et al., "The Design of Complicated Electric Power Load Identifying and Controlling of Concentrated Power Supply," Software, 2011, vol. 32, No. 4, with an English abstract, 5 pages.
(Continued)

*Primary Examiner* — Terrell S Johnson
(74) *Attorney, Agent, or Firm* — Conley Rose, P.C.

(57) ABSTRACT

A connection manner identification method includes power sourcing equipment separately sending load adjustment indications to powered devices by using data ports, where each load adjustment indication in the load adjustment indications indicates a corresponding powered device to adjust a load. The powered devices are separately connected to power supply ports of the power sourcing equipment by using power supply cables, and the powered devices are separately connected to the data ports of the power sourcing equipment by using data cables. The power sourcing equipment obtains output power changes of the power supply ports caused by load adjustment of the powered devices, and the power sourcing equipment determines, based on the output power changes, a first data port and a power supply port that are connected to a same powered device in the powered devices.

20 Claims, 5 Drawing Sheets

(51) Int. Cl.
  *H04B 10/80* (2013.01)
  *G06F 1/26* (2006.01)
  *H04L 12/40* (2006.01)
  *H04L 12/10* (2006.01)

(52) U.S. Cl.
  CPC ........ *H04L 12/10* (2013.01); *H04L 12/40045* (2013.01)

(56) References Cited

U.S. PATENT DOCUMENTS

| | | |
|---|---|---|
| 10,256,639 B2* | 4/2019 | Cheng ................... H04L 12/10 |
| 10,379,921 B1 | 8/2019 | Venkatagiri et al. |
| 2009/0307515 A1 | 12/2009 | Bandholz et al. |
| 2010/0117808 A1 | 5/2010 | Karam |
| 2014/0119742 A1* | 5/2014 | Liu ........................ G06F 1/266 |
| | | 398/171 |
| 2017/0155518 A1* | 6/2017 | Yang ................. H04L 12/40045 |
| 2019/0356497 A1 | 11/2019 | Ji et al. |
| 2020/0174509 A1 | 6/2020 | Dai et al. |

OTHER PUBLICATIONS

Zhang Yong-bin et al., "Communication Between Industrial Computer and Micro-Energy Pulse Power Supply With Nanosecond Pulse Width," Section 3 Manufacturing Automation Technology and Equipment, International Conference on Advanced Technology of Design and Manufacture 2010, 5 pages.

* cited by examiner

CONNECTION MANNER IDENTIFICATION METHOD, POWER SOURCING EQUIPMENT, POWERED DEVICE, AND STORAGE MEDIUM

CROSS-REFERENCE TO RELATED APPLICATION

This application claims priority to Chinese Patent Application No. 202010604440.3 filed on Jun. 29, 2020, which is hereby incorporated by reference in its entirety.

TECHNICAL FIELD

This application relates to the field of power supply technologies, and in particular, to a connection manner identification method, power sourcing equipment, a powered device, and a storage medium.

BACKGROUND

Currently, many devices (such as routers and cameras) that provide services for people's lives need to be powered by other devices when working. Such a device that needs to be powered by another device when working is referred to as a powered device. A device that supplies power to the powered device is referred to as a power supply.

Generally, the power supply is deployed locally on the powered device. Therefore, when a powered device is deployed, a power supply needs to be locally deployed on the powered device based on a deployment location of the powered device.

However, it is inconvenient to locally deploy the power supply on the powered device.

SUMMARY

This application provides a connection manner identification method and apparatus, power sourcing equipment, and a storage medium, to resolve a problem that a power supply needs to be locally deployed on a powered device. Technical solutions provided in this application are as follows:

According to a first aspect, this application provides a connection manner identification method. The method includes: power sourcing equipment separately sending a plurality of load adjustment indications to a plurality of powered devices by using a plurality of data ports, where each load adjustment indication in the plurality of load adjustment indications indicates a corresponding powered device to adjust a negotiation load, the plurality of powered devices are separately connected to a plurality of power supply ports of the power sourcing equipment by using a plurality of power supply cables, and the plurality of powered devices are separately connected to the plurality of data ports of the power sourcing equipment by using a plurality of data cables; the power sourcing equipment obtains output power changes of the plurality of power supply ports caused by negotiation load adjustment of the powered devices; and the power sourcing equipment determines, based on the output power changes, a data port and a power supply port that are connected to a same powered device in the plurality of powered devices.

In the connection manner identification method provided in this application, the power sourcing equipment separately sends the plurality of load adjustment indications to the plurality of powered devices by using the plurality of data ports. After the powered device adjusts the negotiation load of the powered device based on the indication of the power sourcing equipment, because the negotiation load changes a power of the powered device, and an output power of a power supply port connected to the powered device by using a power supply cable also changes, the power sourcing equipment can determine, based on the output power change, a data port and a power supply port that are connected to a same powered device. This implements identification of a first data port and a power supply port that are connected to a same powered device.

The load adjustment indication indicates a corresponding powered device to adjust a negotiation load. In addition, the adjusting the negotiation load may include: connecting the negotiation load to a powered port of the powered device, or disconnecting the negotiation load from the powered port.

In an implementation, load adjustment manners indicated by the plurality of load adjustment indications are different from each other. In this case, manners of adjusting, by the powered devices, respective negotiation loads are different from each other, so that the output power changes of the plurality of power supply ports of the power sourcing equipment caused by negotiation load adjustment of the powered devices are different, and the power sourcing equipment can more accurately determine, based on the output power changes of the power supply ports, a first data port and a power supply port that are connected to a same powered device in the plurality of powered devices.

In this case, the power sourcing equipment simultaneously sends the plurality of load adjustment indications. When the power sourcing equipment simultaneously sends the plurality of load adjustment indications, the power sourcing equipment may send the load adjustment indications to the plurality of powered devices at a time. This reduces a total time consumed for sending the plurality of load adjustment indications, shortens a time of identifying connection manners of the plurality of powered devices, and improves identification efficiency.

In another implementation, the power sourcing equipment sequentially sends the plurality of load adjustment indications. In this way, load adjustment indications sent to different powered devices do not interfere with each other, and a workload of the power sourcing equipment can be reduced.

That the load adjustment manners are different is reflected by one or a combination of the following: load adjustment start time points are different, load adjustment duration is different, quantities of load adjustment times are different, time intervals for every two adjacent times of load adjustment in a plurality of times of load adjustment are different, and amplitudes of output power changes caused by load adjustment are different.

Optionally, that the plurality of load adjustment indications are different may be represented as follows: M load adjustment indications indicate to perform, in a connection manner identification process within duration of n time units, load adjustment based on load adjustment manners indicated by M permutations and combinations in $2^n$ permutations and combinations of n bits of binary numbers, where an $i^{th}$-bit binary number in the permutation and combination indicates a load adjustment status in an $i^{th}$ time unit in the n time units, a binary number 0 in the permutation and combination indicates not to adjust a load, a binary number 1 in the permutation and combination indicates to adjust a load, and M is less than or equal to $2^n$.

When the power sourcing equipment sequentially sends the plurality of load adjustment indications, that the power sourcing equipment determines, based on the output power changes, a first data port and a power supply port that are connected to a same powered device in the plurality of powered devices includes: after sending a load adjustment indication to a first powered device by using a data port, the power sourcing equipment determines that a power supply port whose output power changes and the data port that sends the load adjustment indication are connected to the first powered device, where the first powered device is any one of the plurality of powered devices.

When the load adjustment manners indicated by the plurality of load adjustment indications are different from each other, that the power sourcing equipment determines, based on the output power changes, a data port and a power supply port that are connected to a same powered device in the plurality of powered devices includes: when an output power change manner of a first power supply port matches a load adjustment manner indicated by a load adjustment indication sent by using a first data port, the power sourcing equipment determines that the first power supply port and the first data port are connected to a same powered device, where the first power supply port is any one of the plurality of power supply ports, and the first data port is one of the plurality of data ports.

Specifically, in the connection manner identification process within the duration of n time units, when a binary sequence determined based on an output power of the first power supply port is the same as a permutation and combination of the load adjustment manner indicated by the load adjustment indication sent by using the first data port, it is determined that the output power change manner of the first power supply port matches the load adjustment manner indicated by the load adjustment indication sent by using the first data port.

A $j^{th}$-bit binary number in the binary sequence indicates an output power change status of the first power supply port in a $j^{th}$ time unit in the n time units, a binary number 0 in the binary sequence indicates that an output power is unchanged, and a binary number 1 in the binary sequence indicates that an output power is changed. The permutation and combination consists of a binary number 0 and a binary number 1, an $i^{th}$-bit binary number in the permutation and combination indicates a load adjustment status in an $i^{th}$ time unit in the n time units, a binary number 0 in the permutation and combination indicates not to adjust a load, and a binary number 1 in the permutation and combination of the binary numbers indicates to adjust a load.

Optionally, that the power sourcing equipment determines, based on the output power changes, a data port and a power supply port that are connected to a same powered device in the plurality of powered devices includes: the power sourcing equipment determining whether the output power changes caused by respective load adjustment of the plurality of powered devices are different from each other; and only when the output power changes caused by respective negotiation load adjustment of the plurality of powered devices are different from each other, the power sourcing equipment determines, based on the output power changes, a data port and a power supply port that are connected to a same powered device in the plurality of powered devices.

When drawing power change statuses of the plurality of powered devices caused by respective negotiation load adjustment of the plurality of powered devices are different from each other, in the connection manner identification process, the output power changes of the power supply ports of the power sourcing equipment caused by negotiation load adjustment of the powered devices are different, so that the power sourcing equipment can more accurately determine, based on the output power changes of the power supply ports, a first data port and a power supply port that are connected to a same powered device in the plurality of powered devices.

Optionally, the method further includes: the power sourcing equipment separately sending status maintenance indications to the plurality of powered devices by using the plurality of data ports, where the status maintenance indications indicate the plurality of powered devices to keep their working statuses unchanged in a connection manner identification process.

When the powered device keeps its working status in the connection manner identification process, a change amount of a power consumed by the powered device in the process does not include a change amount caused by a change of the working status, so that the change amount is mainly a power change caused by an operation required in the connection manner identification process. Therefore, a drawing power change of the powered device caused by factors such as adjustment of the working status can be excluded, and impact of factors such as adjustment of the working status on a result of identifying the connection manner can be eliminated. This ensures accuracy of identifying the connection manner.

Optionally, the load adjustment indications further indicate the plurality of powered devices to keep their working statuses unchanged in a connection manner identification process.

Optionally, the data cable includes an optical fiber.

Correspondingly, when the data cable is an optical fiber, the data cable and the power supply cable may be located in a photoelectric composite cable. When the power sourcing equipment and the powered device are connected by using a photoelectric composite cable, a larger transmission bandwidth and a longer transmission distance can be supported.

According to a second aspect, this application provides a connection manner identification method. The method includes: a powered device receiving a load adjustment indication sent by power sourcing equipment by using a data port, where the load adjustment indication indicates the powered device to adjust a load, a powered port is connected to a power supply port of the power sourcing equipment by using a power supply cable, and a data port of the powered device is connected to the data port of the power sourcing equipment by using a data cable; and the powered device adjusts an on/off state of a switch of the powered device based on the load adjustment indication, to adjust an impact status of a negotiation load on a drawing power of the powered port, where the switch is connected to the powered port and the negotiation load.

After receiving the load adjustment indication sent by the power sourcing equipment by using the data port, the powered device adjusts the negotiation load of the powered device based on the indication of the power sourcing equipment. Because the negotiation load changes a power of the powered device, and an output power of a power supply port connected to the powered device by using a power supply cable also changes, the power sourcing equipment can determine, based on the output power change, a first data port and a power supply port that are connected to a same powered device. This implements identification of a first data port and a power supply port that are connected to a same powered device. In addition, because the powered device can automatically perform the foregoing connection manner identification process, identification efficiency and accuracy can be effectively ensured. In addition, because the powered device can automatically perform the foregoing connection manner identification process, management personnel can remotely control performing of the connection manner identification process, and check, based on the process, whether the connection manner is correct. This improves flexibility of managing the power sourcing equipment and the powered device.

According to a third aspect, this application provides power sourcing equipment, where the power sourcing equipment includes: a power supply management circuit, a processor, a plurality of data ports, and a plurality of power supply ports, a plurality of powered devices are separately connected to the plurality of power supply ports by using a plurality of power supply cables, and the plurality of powered devices are separately connected to the plurality of data ports by using a plurality of data cables; the processor is configured to separately send a plurality of load adjustment indications to the plurality of powered devices by using the plurality of data ports, where each load adjustment indication in the plurality of load adjustment indications indicates a corresponding powered device to adjust a load; the processor is further configured to obtain, from the power supply management circuit, output power changes of the plurality of power supply ports caused by load adjustment of the powered devices; and the processor is further configured to determine, based on the output power changes, a data port and a power supply port that are connected to a same powered device in the plurality of powered devices.

Optionally, load adjustment manners indicated by the plurality of load adjustment indications are different from each other.

Optionally, the processor is specifically configured to simultaneously send the plurality of load adjustment indications.

Optionally, the processor is specifically configured to sequentially send the plurality of load adjustment indications.

Optionally, that the load adjustment manners are different is reflected by one or a combination of the following: load adjustment start time points are different, load adjustment duration is different, quantities of load adjustment times are different, time intervals for every two adjacent times of load adjustment in a plurality of times of load adjustment are different, and amplitudes of output power changes caused by load adjustment are different.

Optionally, M load adjustment indications indicate to perform, in a connection manner identification process within duration of n time units, load adjustment based on load adjustment manners indicated by M permutations and combinations in $2^n$ permutations and combinations of n bits of binary numbers, where an $i^{th}$-bit binary number in the permutation and combination indicates a load adjustment status in an $i^{th}$ time unit in the n time units, a binary number 0 in the permutation and combination indicates not to adjust a load, a binary number 1 in the permutation and combination indicates to adjust a load, and M is less than or equal to $2^n$.

Optionally, the processor is specifically configured to: after sending the load adjustment indication to a first powered device by using a data port, determine that a power supply port whose output power changes and the data port that sends the load adjustment indication are connected to the first powered device, where the first powered device is one of the plurality of powered devices.

Optionally, the processor is specifically configured to: when an output power change manner of a first power supply port matches a load adjustment manner indicated by the load adjustment indication sent by using a first data port, determine that the first power supply port and the first data port are connected to a same powered device, where the first power supply port is any one of the plurality of power supply ports, and the first data port is one of the plurality of data ports.

Optionally, in the connection manner identification process within the duration of n time units, when a binary sequence determined based on an output power of the first power supply port is the same as a permutation and combination of the load adjustment manner indicated by the load adjustment indication sent by using the first data port, it is determined that the output power change manner of the first power supply port matches the load adjustment manner indicated by the load adjustment indication sent by using the first data port.

A $j^{th}$-bit binary number in the binary sequence indicates an output power change status of the first power supply port in a $j^{th}$ time unit in the n time units, a binary number 0 in the binary sequence indicates that an output power is unchanged, and a binary number 1 in the binary sequence indicates that an output power is changed. The permutation and combination consists of a binary number 0 and a binary number 1, an $i^{th}$-bit binary number in the permutation and combination indicates a load adjustment status in an $i^{th}$ time unit in the n time units, a binary number 0 in the permutation and combination indicates not to adjust a load, and a binary number 1 in the permutation and combination of the binary numbers indicates to adjust a load.

Optionally, the processor is specifically configured to: determine whether the output power changes caused by respective load adjustment of the plurality of powered devices are different from each other; and only when the output power changes caused by respective load adjustment of the plurality of powered devices are different from each other, determine, based on the output power changes, a data port and a power supply port that are connected to a same powered device in the plurality of powered devices.

Optionally, the processor is further configured to: separately send status maintenance indications to the plurality of powered devices by using the plurality of data ports, where the status maintenance indications indicate the plurality of powered devices to keep their working statuses unchanged in a connection manner identification process.

Optionally, the load adjustment indications further indicate the plurality of powered devices to keep their working statuses unchanged in a connection manner identification process.

Optionally, the data cable includes an optical fiber.

Optionally, the data cable and the power supply cable are located in a photoelectric composite cable.

According to a fourth aspect, this application provides a powered device, where the powered device includes a processor, a negotiation load, a switch, a data port, and a powered port, the switch is connected to the powered port and the negotiation load, the powered port is configured to connect to a power supply port of power sourcing equipment by using a power supply cable, and the data port is configured to connect to a data port of the power sourcing equipment by using a data cable; the processor is configured to receive a load adjustment indication sent by the power sourcing equipment by using the data port, where the load adjustment indication indicates the powered device to adjust a load; and the processor is further configured to adjust an on/off state of the switch based on the load adjustment indication, to adjust an impact status of the negotiation load on a drawing power of the powered port.

According to a fifth aspect, this application provides a storage medium, and when instructions in the storage medium are executed by a computer, the connection manner identification method provided in the first aspect is implemented.

According to a sixth aspect, this application provides a storage medium, and when instructions in the storage medium are executed by a computer, the connection manner identification method provided in the second aspect is implemented.

According to a seventh aspect, this application provides a computer program product. When the computer program product runs on a computing device, the computing device performs the connection manner identification method provided in the first aspect.

According to an eighth aspect, this application provides a computer program product. When the computer program product runs on a computing device, the computing device performs the connection manner identification method provided in the second aspect.

DESCRIPTION OF EMBODIMENTS

To make the objectives, technical solutions, and advantages of this application clearer, the following further describes the implementations of this application in detail with reference to the accompanying drawings.

Figure 1:
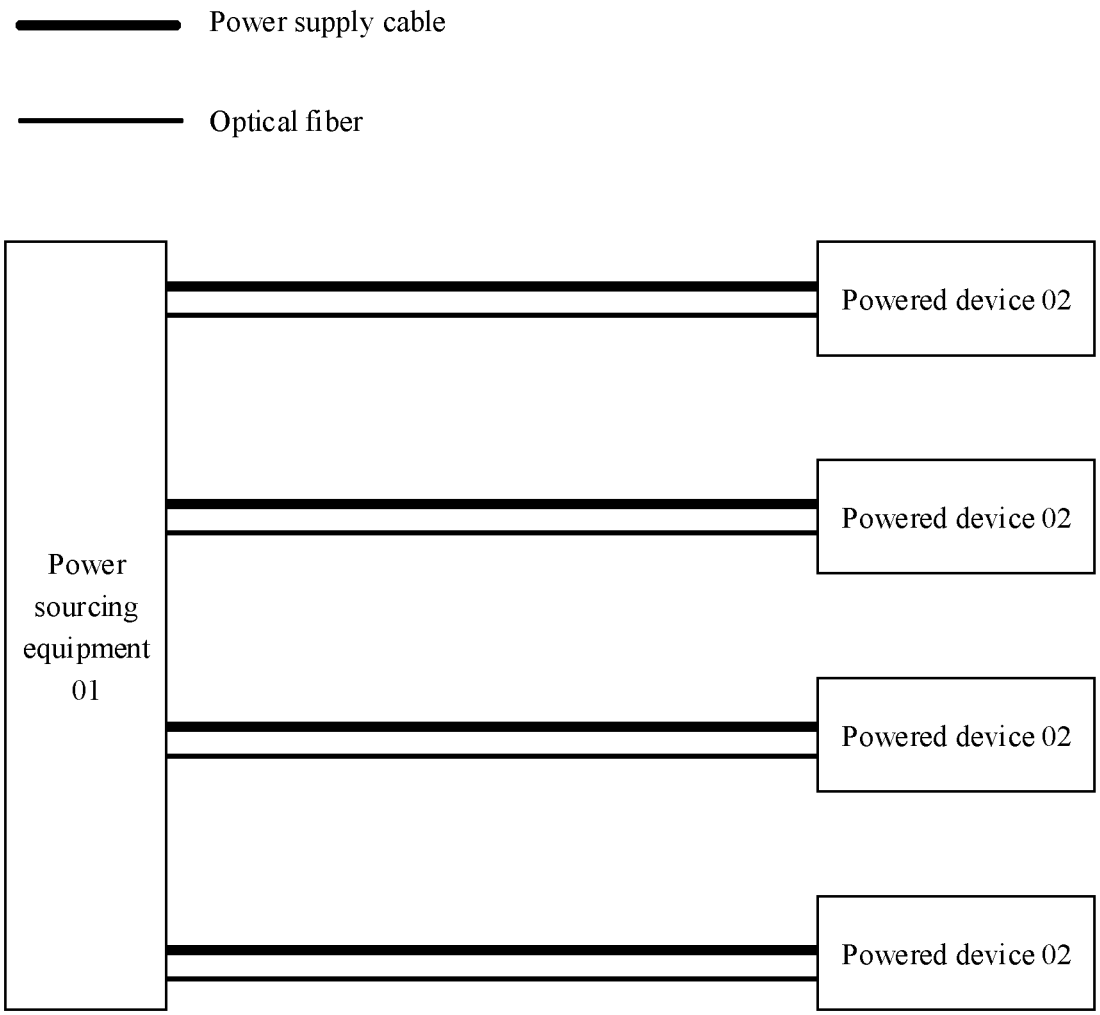
FIG. 1 is a schematic diagram of an implementation environment involved in a connection manner identification method according to an embodiment of this application.

FIG. 1 is a schematic diagram of an implementation environment involved in a connection manner identification method according to an embodiment of this application. As shown in FIG. 1, the implementation environment may include power sourcing equipment 01 and a plurality of powered devices 02. A data cable and a power supply cable are connected between the power sourcing equipment 01 and each powered device. The power sourcing equipment 01 may be a network switch or the like, and the powered device 02 may be a router, a camera, or the like.

A data signal is transmitted between the power sourcing equipment 01 and the powered device 02 by using the data cable. For example, the power sourcing equipment 01 may send, to the powered device 02 by using a data port, a data signal indicating to adjust a working status of the powered device 02, and the powered device 02 may send, to the power sourcing equipment 01 by using a data port, a data signal indicating the working status of the powered device 02.

The power sourcing equipment 01 supplies power to the powered device 02 by using the power supply cable. The power supply cable and the data cable work together to implement power supply control by the power sourcing equipment 01 on the powered device 02.

In this embodiment of this application, the power sourcing equipment 01 and the powered device 02 are connected by using the data cable and the power supply cable, so that the power sourcing equipment 01 can supply power to the powered device 02 at a remote end. Therefore, when the powered device 02 is disposed, it is unnecessary to locally deploy a power supply on the powered device 02, which facilitates deployment of the powered device 02.

In an implementation, the data cable may be an optical fiber. The power supply cable may be any cable that can supply power, such as a copper cable (including two or more copper wires). In addition, the optical fiber and the copper cable may be independent of each other, or may be wrapped in a same housing, or partly wrapped in a same housing. The optical fiber and the copper cable wrapped in the same housing are collectively referred to as a photoelectric composite cable.

Currently, in a power over Ethernet (PoE) technology, the power sourcing equipment 01 supplies power to the powered device 02 by using a twisted pair. The PoE technology can support a transmission distance of up to 100 meters, and can support data transmission of 10 gigabits per a second (Gbps) (Gbps indicates 1000 megabytes per second) and power supply of 90 watts. However, as an amount of data transmission increases, for example, a transmission bandwidth may increase to 25 Gbps or even 100 Gbps, and the transmission distance may increase to 200 meters or longer, in this case, the twisted pair cannot meet the requirement. However, the photoelectric composite cable can provide a relatively large transmission bandwidth and support a relatively long transmission distance. Therefore, when the power sourcing equipment 01 and the powered device 02 are connected by using the photoelectric composite cable, a relatively large transmission bandwidth and a relatively long transmission distance can be supported.

Figure 2:
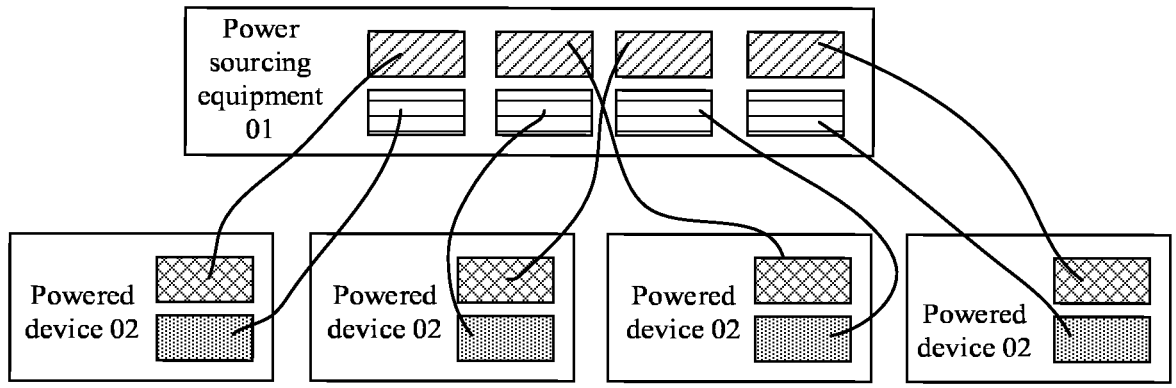
FIG. 2 is a schematic diagram in which power sourcing equipment is connected to a plurality of powered devices according to an embodiment of this application.

The power sourcing equipment 01 has a plurality of power supply ports and a plurality of data ports. The powered device 02 has a powered port and a data port. In this embodiment of this application, to facilitate description of the data port of the power sourcing equipment 01 and the data port of the powered device 02, the data port of the power sourcing equipment 01 is referred to as a first data port, and the data port of the powered device 02 is referred to as a second data port. As shown in FIG. 2, the plurality of powered devices 02 are separately connected to the plurality of power supply ports of the power sourcing equipment 01 by using a plurality of power supply cables (as shown in grids filled by slashes in FIG. 2), and the plurality of powered devices 02 are separately connected to a plurality of first data ports of the power sourcing equipment 01 by using a plurality of data cables (as shown in grids filled by horizontal lines in FIG. 2).

The power sourcing equipment needs to use both a data cable and a power supply cable to control a same powered device. After the data cables and the power supply cables are used to connect the power sourcing equipment and the powered devices, a data cable and a power supply cable that are connected to a same powered device may not necessarily be matched in a one-to-one correspondence, or there may be another crossover between the cables after matching is completed. Therefore, it is important to identify a data cable and a power supply cable that are connected to a same powered device, that is, to identify a first data port and a power supply port that are connected to a same powered device.

Therefore, an embodiment of this application provides a connection manner identification method. In the connection manner identification method, power sourcing equipment separately sends a plurality of load adjustment indications to a plurality of powered devices by using a plurality of data ports (each data port usually sends one load adjustment indication), to indicate corresponding powered devices to perform load adjustment. Then, the power sourcing equipment obtains output power changes generated by a plurality of power supply ports caused by load adjustment of the powered devices, and determines, based on the output power changes, a first data port and a power supply port that are connected to a same powered device in the plurality of powered devices.

In this way, after the powered device adjusts a load of the powered device based on the indication of the power sourcing equipment, the load changes a drawing power of the powered device, and an output power of a power supply port connected to the powered device by using the power supply cable also changes. Therefore, the power sourcing equipment can determine, based on the output power change, a first data port and a power supply port that are connected to a same powered device. This implements identification of the first data port and the power supply port that are connected to the same powered device. In addition, because the connection manner identification method can be automatically performed, identification efficiency and accuracy can be effectively ensured.

Figure 3:
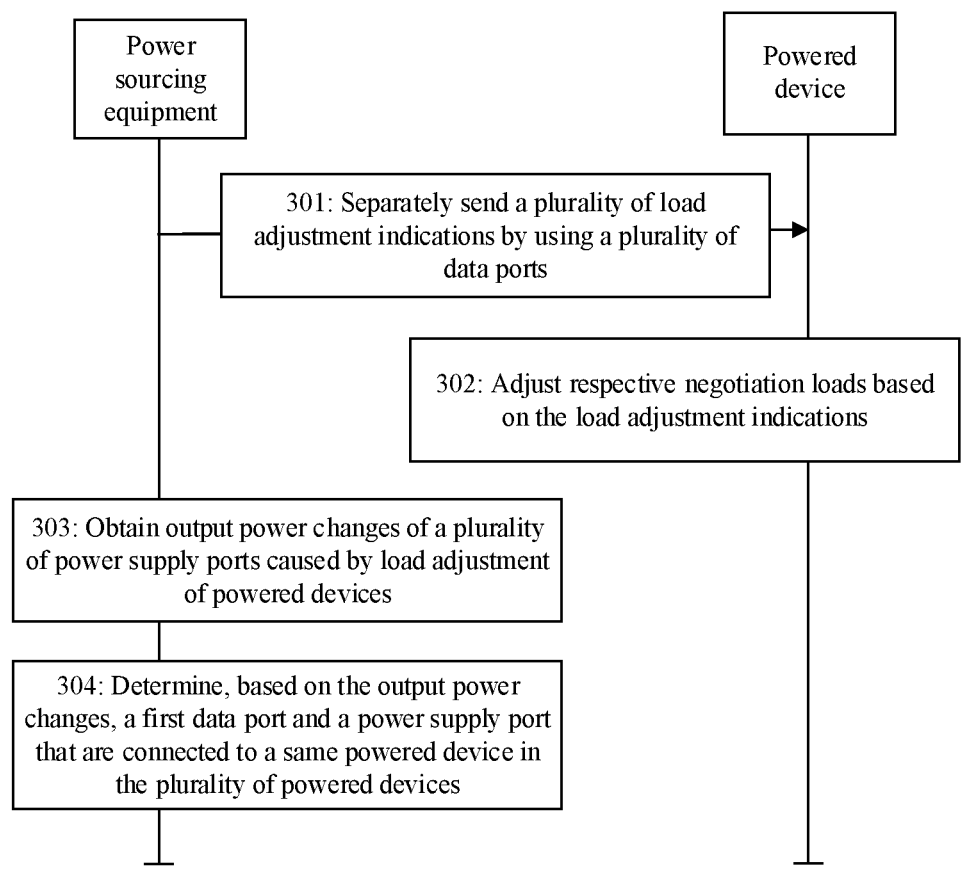
FIG. 3 is a flowchart of a connection manner identification method according to an embodiment of this application.

The following describes an implementation process of a connection manner identification method according to an embodiment of this application. FIG. 3 is a flowchart of a connection manner identification method according to an embodiment of this application. As shown in FIG. 3, the method may include the following steps.

Step 301: Power sourcing equipment separately sends a plurality of load adjustment indications to a plurality of powered devices by using a plurality of data ports.

Each load adjustment indication in the plurality of load adjustment indications indicates a corresponding powered device to adjust a load. In addition, adjusting a load may include: increasing a load of the powered device, or reducing a load of the powered device.

Optionally, load adjustment manners indicated by the plurality of load adjustment indications separately sent to the plurality of powered devices may be completely the same, partly the same, or different from each other. In addition, that the load adjustment manners are different may be reflected by one or a combination of the following: load adjustment start time points are different, load adjustment duration is different, quantities of load adjustment times are different, time intervals for every two adjacent times of load adjustment in a plurality of times of load adjustment are different, and amplitudes of output power changes caused by load adjustment are different.

That load adjustment start time points of the plurality of powered devices are different means that the plurality of powered devices start to adjust their loads at different moments. That load adjustment duration of the plurality of powered devices is different means that duration of adjusting their loads by the plurality of powered devices is different. Alternatively, when the plurality of powered devices need to adjust the loads for a plurality of times in a connection relationship identification process, that the load adjustment duration of the plurality of powered devices is different means that duration of the plurality of powered devices is different in each load adjustment. In addition, duration of adjusting a load by a same powered device in a plurality of times may be completely the same, partly the same, or different from each other. This is not specifically limited in this embodiment of this application. That quantities of load adjustment times of the plurality of powered devices are different means that the plurality of powered devices adjust their loads for one or more times in the connection manner identification process, and total quantities of times that different powered devices adjust their loads in the process are different. That time intervals for every two adjacent times of load adjustment in a plurality of times of load adjustment of the plurality of powered devices are different means that all the plurality of powered devices adjust their loads for a plurality of times in the connection manner identification process, and time intervals of load adjustment of different powered devices in the process of the plurality of times of adjustment are different. In addition, time intervals of adjusting a load by a same powered device in a plurality of times may be completely the same, partly the same, or different from each other. This is not specifically limited in this embodiment of this application.

In an implementation, that the load adjustment manners indicated by the plurality of load adjustment indications are different may be represented as follows: M load adjustment indications indicate to perform, in a connection manner identification process within duration of n time units, load adjustment based on load adjustment manners indicated by M permutations and combinations in $2^n$ permutations and combinations of n bits of binary numbers. An $i^{th}$-bit binary number in the permutation and combination indicates a load adjustment status in an $i^{th}$ time unit in the n time units, one binary number (binary number 0 or binary number 1) in the permutation and combination indicates not to adjust a load, the other binary number (if the binary number indicating not to adjust a load is a binary number 1, the other binary number is a binary number 0; or if the binary number indicating not to adjust a load is a binary number 0, the other binary number is a binary number 1) in the permutation and combination indicates to adjust a load, and M is less than or equal to $2^n$. "To adjust a load" and "not to adjust a load" indicated by the binary numbers in the permutation and combination are for a status of the powered device before receiving the load adjustment indication. In addition, a length of a time unit may be set based on an application requirement. For example, a time unit may be 1 second, 2 seconds, or 5 seconds. This is not specifically limited in this embodiment of this application.

For example, it is assumed that the power sourcing equipment separately sends four load adjustment indications to four (that is, $2^2$) powered devices. In a process in which the four load adjustment indications indicate to identify a connection manner within duration of two time units (that is, n=2), the four powered devices separately adjust loads in load adjustment manners indicated by four permutations and combinations of 2 bits of binary numbers, and the four permutations and combinations are respectively 00, 01, 10, and 11. An $i^{th}$-bit binary number in each permutation and combination indicates a load adjustment status in an $i^{th}$ time unit, a binary number 0 in the permutation and combination indicates not to adjust a load, and a binary number 1 in the permutation and combination indicates to adjust a load. For example, the first-bit binary number in 01 is 0, which indicates the powered device not to adjust a load in the first time unit, and the second-bit binary number in 01 is 1, which indicates the powered device to adjust the load in the second time unit.

Optionally, there may be a plurality of implementations in which the power sourcing equipment sends the load adjustment indications to the plurality of powered devices. In this embodiment of this application, the following two implementations are used as examples for description.

In a first implementation of sending the load adjustment indications, the power sourcing equipment may simultaneously send the plurality of load adjustment indications. In this case, to distinguish between output power changes of power supply ports caused by load adjustment, the load adjustment manners indicated by the plurality of load adjustment indications need to be different from each other.

When the power sourcing equipment simultaneously sends the plurality of load adjustment indications, the power sourcing equipment may send the load adjustment indications to the plurality of powered devices at a time. This reduces a total time consumed for sending the plurality of load adjustment indications, shortens a time of identifying connection manners of the plurality of powered devices, and improves identification efficiency.

In a second implementation of sending the load adjustment indications, the power sourcing equipment may sequentially send the plurality of load adjustment indications to the plurality of powered devices. That the power sourcing equipment sequentially sends the plurality of load adjustment indications to the plurality of powered devices means that after a load adjustment indication is sent to one powered device, then a load adjustment indication is sent to one powered device of powered devices that no load adjustment indication is sent; by analogy, until the load adjustment indications are sent to all the plurality of powered devices. In addition, a sequence in which the power sourcing equipment sequentially sends the plurality of load adjustment indications may be set according to an actual requirement. For example, the sequence may be specified by a user in advance, or may be configured based on disposing locations of the plurality of power supply ports, or may be a sequence specified by the power sourcing equipment itself. This embodiment of this application sets no specific limitation thereto.

When the power sourcing equipment sequentially sends the plurality of load adjustment indications, load adjustment indications sent to different powered devices do not interfere with each other, which can reduce a workload of the power sourcing equipment.

Optionally, that the power sourcing equipment sends the load adjustment indication may be implemented by using a field in a data signal. In an implementation, the data signal may carry an identification negotiation field. The identification negotiation field may have one or more values, and content indicated by different values is different. In addition, when the load adjustment indication includes content of a plurality of aspects, the identification negotiation field may include a plurality of sub-fields, and the plurality of sub-fields separately indicate the content of the plurality of aspects. For example, when the load adjustment indication includes content of a plurality of aspects such as a load adjustment start time, load adjustment duration, a load adjustment quantity, a time interval for every two adjacent times of load adjustment in a plurality of times of load adjustment, and an output power change amplitude caused by load adjustment, the identification negotiation field may include a plurality of sub-fields, and the plurality of sub-fields separately indicate the content of the plurality of aspects.

In an implementation, when the power sourcing equipment sends a data signal to the powered device in a Link Layer Discovery Protocol (LLDP) frame, as shown in Table 1, the LLDP packet may carry an identification negotiation field with a length of 30 bits. The identification negotiation field includes five sub-fields, and the five sub-fields respectively indicate whether to adjust a load, load adjustment duration, a load adjustment quantity, a time interval for every two adjacent times of load adjustment, and an output power change amplitude caused by load adjustment. Lengths of the five sub-fields are respectively 2 bits, 4 bits, 4 bits, 4 bits, and 16 bits.

In addition, when values of a same sub-field are different, meanings of the sub-field are different. For example, as shown in Table 1, when a value of a sub-field 1 indicating whether to adjust a load is 01, it indicates to adjust a load. When all the plurality of powered devices need to perform load adjustment for a plurality of times in a connection relationship identification process, if a value of a sub-field 2 indicating the load adjustment duration is 1, it indicates that duration of each load adjustment is 1 second, . . . , and if the value of the sub-field indicating the load adjustment duration is F (represented in hexadecimal), it indicates that duration of each load adjustment is 16 seconds. When a value of a sub-field 3 indicating the load adjustment quantity is 1, it indicates that load adjustment is performed for a total of one time in the connection relationship identification process, . . . , and when the value of the sub-field 3 indicating the load adjustment quantity is F, it indicates that load adjustment is performed for a total of 16 times in the connection relationship identification process. When a value of a sub-field 4 indicating the time interval for every two adjacent times of load adjustment is 1, it indicates that the time interval for every two adjacent times of load adjustment is 1 second, . . . , and when the value of the sub-field indicating the time interval for every two adjacent times of load adjustment is F, it indicates that the time interval for every two adjacent times of load adjustment is 16 seconds. When a value of a sub-field 5 indicating an output power change amplitude caused by load adjustment is 0001, it indicates that an output power change amplitude caused by load adjustment is 1 milliwatt, . . . , and when the value of the sub-field 5 indicating an output power change amplitude caused by load adjustment is FFFF, it indicates that an output power change amplitude caused by load adjustment is 65.536 watts.

TABLE 1

| Identification negotiation field | | | | |
| --- | --- | --- | --- | --- |
| Sub-field 1 | Sub-field 2 | Sub-field 3 | Sub-field 4 | Sub-field 5 |
| 01 | 1 | 1 | 1 | 0001 |

In an implementation scenario, the power sourcing equipment may further control the plurality of powered devices to keep their working statuses unchanged in the connection manner identification process. Correspondingly, the powered device may keep its working status unchanged based on control of the power sourcing equipment.

In an implementation, in a process in which the powered device keeps its working status unchanged, when receiving an indication for adjusting its working status, the powered device may not respond to the indication for adjusting its working status. For example, when the powered device is a camera, in a process in which the camera keeps its working status unchanged, if the camera receives an instruction for instructing to switch a working mode, the camera does not respond to the instruction, to avoid a drawing power change of the camera caused by switching of the working mode. It should be noted that when the powered device receives the indication for adjusting its working status, the powered device may further estimate duration required by a response process of the indication. If the duration required by the response process of the indication is greater than duration required by a connection status identification process, it indicates that a power change caused by adjusting the working status based on the indication does not occur in the connection status identification process, and the powered device may also respond to the indication.

When the powered device keeps its working status in the connection manner identification process, a change amount of a power consumed by the powered device in the process does not include a change amount caused by a change of the working status, so that the change amount is mainly a power change caused by an operation required in the connection manner identification process. Therefore, a drawing power change of the powered device caused by factors such as adjustment of the working status can be excluded, and impact of factors such as adjustment of the working status on a result of identifying the connection manner can be eliminated, thereby ensuring accuracy of identifying the connection manner.

In an implementation of controlling the powered device to keep its working status unchanged, the load adjustment indications may further indicate the plurality of powered devices to keep their working statuses unchanged in the connection manner identification process.

Optionally, when the load adjustment indication is implemented by using a field in the data signal, the identification negotiation field may further include a field indicating the plurality of powered devices whether to keep their working statuses unchanged in the connection manner identification process. For example, as shown in Table 2, when the load adjustment indication is sent in the LLDP frame, the identification negotiation field may further include a sub-field 6. The sub-field 6 has two values 01 and 00. When the value of the sub-field 6 is 01, the sub-field 6 indicates the powered device to start to keep its working status unchanged. When the value of the sub-field 6 is 00, the sub-field 6 indicates the powered device to stop keeping its working status unchanged.

TABLE 2

| Identification negotiation field | | | | | |
| --- | --- | --- | --- | --- | --- |
| Sub-field 1 | Sub-field 2 | Sub-field 3 | Sub-field 4 | Sub-field 5 | Sub-field 6 |
| 01 | 1 | 1 | 1 | 0001 | 01 |

In another implementation of controlling the powered device to keep its working status unchanged, the power sourcing equipment may further separately send status maintenance indications to the plurality of powered devices by using the plurality of data ports. The status maintenance indications indicate the plurality of powered devices to keep their working statuses unchanged in the connection manner identification process.

Optionally, the status maintenance indication sent by the power sourcing equipment may be implemented by using a field in the data signal. In an implementation, the data signal may carry a status indication field, and the status indication field may have one or more values. Content indicated by different values is different, and one of the values indicates a received end of the data signal to keep its working status unchanged.

For example, when the status maintenance indication is sent in an LLDP frame, the LLDP packet may carry a status indication field with a length of 2 bits. The status indication field has two values 01 and 00. When the value of the status indication field is 01, the status indication field indicates the powered device to start to keep its working status unchanged. When the value of the status indication field is 00, the status indication field indicates the powered device to stop keeping its working status unchanged.

In addition, the status maintenance indication and the load adjustment indication may be sent in one data signal or in different signals. This is not specifically limited in this embodiment of this application. For example, when both the status maintenance indication and the load adjustment indication are implemented by using fields in a data signal, a field used to indicate the status maintenance indication and a field used to indicate the load adjustment indication may be carried in a same data signal, or both may be separately carried in two data signals. Further, when the field used to indicate the status maintenance indication and the field used to indicate the load adjustment indication are carried in a same data signal, the data signal may further indicate the powered device to adjust its load based on the load adjustment indication after starting to keep its working status unchanged for specified duration. When the field used to indicate the status maintenance indication and the field used to indicate the load adjustment indication are separately carried in two data signals, the data signal that carries the field indicating the load adjustment indication may be sent after specified duration after the data signal that carries the field indicating the status maintenance indication is sent to the powered device.

In an implementation, when the status indication field indicating the status maintenance indication and the identification negotiation field used to indicate the load adjustment indication are carried in a same data signal, a signal format of the data signal is shown in Table 3.

TABLE 3

| (State indication field) | Identification negotiation field | | | | |
| --- | --- | --- | --- | --- | --- |
| 01 | Sub-field 1 | Sub-field 2 | Sub-field 3 | Sub-field 4 | Sub-field 5 |
| | 01 | 1 | 1 | 1 | 0001 |

It should be noted that a manner in which the power sourcing equipment controls the powered device to keep its working status unchanged in the connection manner identification process is not limited to the foregoing manner. For example, the power sourcing equipment and the powered device may further negotiate with each other in advance: when the powered device receives the load adjustment indication, the powered device keeps its working status unchanged, and when the powered device receives the load adjustment indication sent by the power sourcing equipment, the powered device may control itself to keep its working status unchanged.

In addition, when the load adjustment manners indicated by the plurality of load adjustment indications are different from each other, before step 301 is performed, the power sourcing equipment may further determine whether output power changes caused by respective load adjustment of the plurality of powered devices are different from each other. Only when the power sourcing equipment determines that the output power changes of the power sourcing equipment caused by respective load adjustment of the plurality of powered devices are different from each other, the power sourcing equipment performs step 301. "Only when" means that when the power sourcing equipment determines that the output power changes of the power sourcing equipment caused by respective load adjustment of the plurality of powered devices are completely the same or partly the same, the power sourcing equipment does not perform the step of sending the plurality of load adjustment indications to the plurality of powered devices. When the output power changes of the power sourcing equipment caused by respective load adjustment of the plurality of powered devices are different from each other, the plurality of power supply ports can be differentiated because of the output power changes caused by respective load adjustment of the plurality of powered devices, so that the power sourcing equipment can accurately determine, based on the output power changes of the power supply ports, a first data port and a power supply port that are connected to a same powered device in the plurality of powered devices.

In a process of manufacturing the powered device, a default manner of adjusting a load based on a load adjustment indication may be preset in the powered device, and a drawing power change status of the powered device caused by load adjustment is stored in the powered device. When the power sourcing equipment needs to identify a connection manner to the powered device, the power sourcing equipment may control the plurality of powered devices to send drawing power change statuses of the plurality of powered devices caused by respective load adjustment of the plurality of powered devices, so that the power sourcing equipment can determine, based on the change conditions, whether the output power changes of the plurality of power supply ports caused by respective load adjustment of the plurality of powered devices are different from each other. In addition, the power sourcing equipment may determine, by determining whether a difference between drawing power change values of every two powered devices caused by their load adjustment is greater than a difference threshold, whether drawing power change statuses of every two powered devices caused by their load adjustment are different from each other, and when a difference between drawing power change values of every two powered devices in the plurality of powered devices caused by their load adjustment is greater than the difference threshold, determine that the output power changes of the power sourcing equipment caused by respective load adjustment of the plurality of powered devices are different from each other.

Step 302: The plurality of powered devices adjust respective loads based on the load adjustment indications.

In an implementation, because the powered device causes power consumption in a working mode of the powered device, load adjustment on the powered device may be implemented by adjusting a load of the powered device in the working mode.

In another implementation, a negotiation load may be specially disposed for the powered device, and the negotiation load may be disposed inside or outside a housing of the powered device. For example, a negotiation load may be disposed in each powered device. After the powered device receives the load adjustment indication sent by the power sourcing equipment, the powered device may adjust, based on the load adjustment indication, an impact status of the negotiation load on a drawing power of a powered port, to change the drawing power of the powered port. In addition, one or more negotiation loads may be configured in each powered device, and amplitudes of power changes caused when the plurality of negotiation loads are adjusted are different. When a plurality of negotiation loads are disposed in the powered device, the load adjustment indication may further indicate a negotiation load that needs to be adjusted. Correspondingly, the powered device may adjust a specified negotiation load based on the indication of the power sourcing equipment, or the powered device may adjust, based on an in-advance configuration of a user, one negotiation load indicated in the plurality of negotiation loads.

In an optional structure of the powered device, the powered device includes a processor, a negotiation load, a switch, a second data port, and a powered port, and the switch is connected to the powered port and the negotiation load. After receiving the load adjustment indication sent by the power sourcing equipment, the processor may adjust an on/off state of the switch based on the load adjustment indication, to adjust an impact status of the negotiation load on a drawing power of the powered port. The negotiation load may be a resistor.

Figure 4:
FIG. 4 is a schematic diagram in which a negotiation load is disposed on a powered device according to an embodiment of this application.
Figure 5:
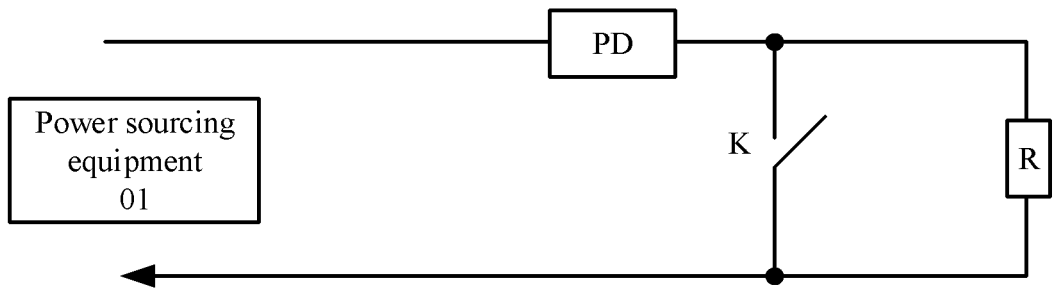
FIG. 5 is another schematic diagram in which a negotiation load is disposed on a powered device according to an embodiment of this application.

For example, as shown in FIG. 4 and FIG. 5, a negotiation load R may be disposed on a powered loop of the powered device PD and the powered device PD in FIG. 4, and FIG. 5 represents a housing of the powered device. In addition, as shown in FIG. 4, the negotiation load R and a switch K may be connected in series. When the switch is in an open state, the negotiation load is not connected to the powered loop of the powered device, and the load of the powered device does not include the negotiation load. When the switch is in a closed state, the negotiation load is connected to the powered loop of the powered device, and the load of the powered device includes the negotiation load. Therefore, by controlling the on/off state of the switch, the impact status of the negotiation load on the drawing power of the powered port can be changed. Alternatively, as shown in FIG. 5, the negotiation load R and the switch K may be connected in parallel. In this case, when the switch is in the open state, the negotiation load is connected to the powered loop of the powered device, and the load of the powered device includes the negotiation load. When the switch is in the closed state, the negotiation load is short-circuited by the switch, and the load of the powered device does not include the negotiation load. Therefore, by controlling the on/off state of the switch, the impact status of the negotiation load on the drawing power of the powered port can be changed.

It should be noted that when the negotiation load is specially disposed for the powered device, a rated power of the negotiation load may be set based on an actual requirement. For example, in consideration of factors such as heat dissipation of the negotiation load, the rated power of the negotiation load, and an identification error, the rated power of the negotiation load may be 1 watt.

Step 303: The power sourcing equipment obtains output power changes of a plurality of power supply ports caused by load adjustment of the powered devices.

After the powered device adjusts its load, the drawing power of the powered device changes, and the output power of the power sourcing equipment that supplies power to the powered device correspondingly changes. In addition, an output power change of the power sourcing equipment may be reflected by an output power change of a power supply port connected to the powered device that adjusts its load. Therefore, the power sourcing equipment may separately obtain output powers of the plurality of power supply ports of the power sourcing equipment before and after load adjustment, and determine, based on the output powers before and after load adjustment, the output power changes of the plurality of power supply ports caused by load adjustment of the powered devices. For example, before load adjustment, if all output powers of a power supply port 1 to a power supply port 10 of the power sourcing equipment are 10 watts, after the negotiation load is adjusted, the output power of the power supply port 1 is 11 watts, and all the output powers of a power supply port 2 to the power supply port 10 are 10 watts, it may be determined that the output power of the power supply port 1 changes, and a change magnitude is 1 watt.

An implementation in which the power sourcing equipment obtains the output power of the power supply port may include the following: a current detector built in the power sourcing equipment is used to detect a port current of the power supply port, a voltage detector built in the power sourcing equipment is used to detect a port voltage of the power supply port, and the output power of the power supply port is obtained based on the port current and the port voltage. In addition, an implementation in which the power sourcing equipment obtains the output power of the power supply port is not limited thereto, or may be another obtaining manner. This is not specifically limited in this embodiment of this application.

In addition, the output power change is not limited to being represented by using the change magnitude, or may be represented by using a representation form such as a change trend of the output powers. For example, the change trend of the output powers may be a waveform of the output powers. Alternatively, when a high level is used to represent the output power of the power supply port after load adjustment, and a low level is used to represent the output power of the power supply port during load adjustment, a waveform including at least one of the high level and the low level may be used to represent the change trend of the output powers, or a level sequence (such as a binary sequence) of levels arranged by time in different time units may be used to represent the change trend of the output powers. Alternatively, the change trend of the output powers may be a sampling sequence in which sampled data is arranged by sampling time after the waveform of the output powers is sampled periodically. Alternatively, the change trend of the output powers may be a change sequence in which detected output powers are arranged by detection time when the output powers of the power supply ports are detected periodically. When the waveform of the output powers is sampled periodically, the waveform may be sampled in an intermediate time period of a period, to bypass a start time and an end time of the period. When load adjustment is performed periodically, the output powers are relatively stable in the intermediate time period of the period. Therefore, accuracy of the obtained output powers can be ensured by sampling in the intermediate time period of the period. Similarly, when the output powers are detected periodically, the output powers may be detected in an intermediate period of a period, to ensure accuracy of the detected output powers.

In an implementation, it is assumed that if the powered device adjusts the negotiation load within four time units based on a binary number permutation and combination 1010 in the connection manner identification process, and adjusting the negotiation load increases the drawing power of the powered device, the output power of the power supply port connected to the powered device increases correspondingly. If a binary number 1 is used to indicate that the output power of the power supply port increases, and a binary number 0 is used to indicate that the output power of the power supply port keeps unchanged, the change conditions of the output powers may be represented by using a binary number sequence 1010.

In addition, when the power sourcing equipment sends the load adjustment indication to the powered device in different manners, the power sourcing equipment obtains, also at different time, the output power change of the power supply port caused by negotiation load adjustment of the powered device. In an implementation, corresponding to the implementation in which the power sourcing equipment simultaneously sends the plurality of load adjustment indications, because the plurality of load adjustment indications separately sent to the plurality of powered devices are different from each other, and the output power changes of power supply ports connected to the plurality of powered devices caused by load adjustment are also different from each other, the output power changes of the power supply ports may be correspondingly obtained in the load adjustment manners indicated by the load adjustment indications.

For example, when that the load adjustment manners indicated by the load adjustment indications are different is reflected by any one or more of: load adjustment start time points are different, load adjustment duration is different, quantities of load adjustment times are different, time intervals for every two adjacent times of load adjustment in a plurality of times of load adjustment are different, and amplitudes of output power changes caused by load adjustment are different, because these differences need to be represented in a dynamic process, the power sourcing equipment may continuously monitor the output power changes of all power supply ports after sending the load adjustment indications.

In another implementation, corresponding to the implementation in which the power sourcing equipment sequentially sends the plurality of load adjustment indications, the power sourcing equipment may obtain the output power changes of all power supply ports of the power sourcing equipment each time after sending the load adjustment indication.

It should be noted that, after the power sourcing equipment is initially connected to the plurality of powered devices, the connection manner identification method provided in this embodiment of this application may be performed. In this case, before the powered device adjusts its load, power consumption of the power supply port connected to the powered device may be referred to as basic power consumption of the powered device. After the power sourcing equipment is initially connected to the powered device, the basic power consumption of the powered device is not affected by a working status of the powered device. Therefore, it can be ensured that the output power change of the power supply port accurately reflects a load adjustment condition, and further, accuracy of identifying the connection manner based on the output power change of the power supply port can be ensured.

It should be further noted that, after specified duration after sending the load adjustment indications to the powered devices, the power sourcing equipment may obtain the output power changes of the plurality of power supply ports caused by load adjustment of the powered devices. The specified duration is at least equal to a sum of duration used by the powered device to adjust its load based on the load adjustment indication and duration for reaching a stable state after load adjustment. In addition, a value of the specified duration may be set based on an actual requirement. For example, the specified duration may be 3 seconds. This is not specifically limited in this embodiment of this application.

Step 304: The power sourcing equipment determines, based on the output power changes, a first data port and a power supply port that are connected to a same powered device in the plurality of powered devices.

When the power sourcing equipment sends the load adjustment indications to the powered devices in different manners, implementation processes of step 304 are different. The following separately uses the two implementations of sending the load adjustment indications by the power sourcing equipment to the powered devices provided in step 301 as examples to describe implementations of step 304.

Corresponding to the first implementation in which the power sourcing equipment sends the load adjustment indications to the powered devices, because the plurality of load adjustment indications separately sent to the plurality of powered devices are different from each other, the output power changes of the power supply ports connected to the plurality of powered devices caused by load adjustment are different from each other, that is, the plurality of load adjustment indications are in a one-to-one correspondence with the output power changes of the plurality of power supply ports, when an output power change manner of a first power supply port matches a load adjustment manner indicated by a load adjustment indication sent by using a first data port, the power sourcing equipment may determine that the first power supply port and the first data port are connected to a same powered device. The first power supply port is any one of the plurality of power supply ports, and the first data port is one of the plurality of data ports.

Optionally, that the output power change manner of the first power supply port matches the load adjustment manner indicated by the load adjustment indication sent by using the first data port may include that the output power change manner of the first power supply port is the same as an output power change manner of the first power supply port caused, within an error range, by the load adjustment manner indicated by the load adjustment indication sent by using the first data port.

As described above, that the load adjustment manners are different may include a plurality of cases, and the output power change manners of the power supply ports may also include a plurality of cases. For example, when that the load adjustment manners are different is reflected by different load adjustment start time points, that the output power change manners of the power supply ports are different may be represented as: the output powers of the power supply ports change at different times. When that the load adjustment manners are different is reflected by different load adjustment duration, that the output power change manners of the power supply ports are different may be represented as: the output powers of the power supply ports change for different duration. When that the load adjustment manners are different is reflected by different load adjustment quantities, that the output power change manners of the power supply ports are different may be represented as: the output powers of the power supply ports change for different quantities of times. When that the load adjustment manners are different is reflected by different time intervals for every two adjacent times of load adjustment in a plurality of times of load adjustment, that the output power change manners of the power supply ports are different may be represented as: the output powers of the power supply ports change at different intervals. When that the load adjustment manners are different is reflected by different amplitudes of output power changes caused by load adjustment, that the output power change manners of the power supply ports are different may be represented as: the output powers of the power supply ports change by different amplitudes. When that the load adjustment manners are different is reflected by a combination of a plurality of the following: load adjustment start time points are different, load adjustment duration is different, quantities of load adjustment times are different, time intervals for every two adjacent times of load adjustment in a plurality of times of load adjustment are different, and amplitudes of output power changes caused by load adjustment are different, that the output power change manners of the power supply ports are different may be reflected by a combination of a plurality of different output power changes of the power supply ports corresponding to different load adjustment. In addition, when the output power change is represented by a change trend, different output power change manners are represented by different change trends. Correspondingly, whether the output power change manner of the first power supply port matches the load adjustment manner indicated by the load adjustment indication sent by using the first data port may be determined based on the foregoing forms of the output power change.

For example, when M load adjustment indications indicate to perform, in a connection manner identification process within duration of n time units, load adjustment based on load adjustment manners indicated by M permutations and combinations in $2^n$ permutations and combinations of n bits of binary numbers, in the connection manner identification process within the duration of n time units, when a binary sequence determined based on the output power of the first power supply port is the same as a permutation and combination of the load adjustment manner indicated by the load adjustment indication sent by using the first data port, it may be determined that the output power change manner of the first power supply port matches the load adjustment manner indicated by the load adjustment indication sent by using the first data port. A $j^{th}$-bit binary number in the binary sequence indicates an output power change status of the first power supply port in a $j^{th}$ time unit in the n time units, a binary number 0 in the binary sequence indicates that an output power is unchanged, and a binary number 1 in the binary sequence indicates that an output power is changed. In addition, the $j^{th}$-bit binary number may indicate that the output power continuously increases or decreases by $\Delta x$ within an error range in the $j^{th}$ time unit, or indicates that the output power increases or decreases by $\Delta x$ within the error range based on sampled data of the output power.

Corresponding to the second implementation in which the power sourcing equipment sends the load adjustment indications to the powered devices, when the power sourcing equipment sequentially sends the load adjustment indications to the plurality of powered devices, each time after sending a load adjustment indication, the power sourcing equipment obtains output power changes of all power supply ports of the power sourcing equipment. Therefore, after the power sourcing equipment sends a load adjustment indication to one powered device, if an output power of one power supply port of the power sourcing equipment changes, the output power change is necessarily caused by load adjustment of the powered device, and both the power supply port whose output power changes and a data port that sends the load adjustment indication to the powered device are connected to the powered device. To be specific, after sending a load adjustment indication to a first powered device, the power sourcing equipment determines that a power supply port whose output power changes and a first data port that sends the load adjustment indication to the first powered device are connected to the first powered device.

Optionally, after sending a load adjustment indication to a powered device, if an output power of a power supply port of the power sourcing equipment changes, the power sourcing equipment may further determine whether the output power change of the power supply port is the same as an output power change manner of a first power supply port caused by the load adjustment indication within an error range, and when the output power change of the power supply port is the same as the output power change manner of the first power supply port caused by the load adjustment indication within the error range, the power sourcing equipment determines that the power supply port whose output power changes and a first data port that sends the load adjustment indication to the powered device are connected to the powered device, to further ensure identification accuracy.

It should be noted that before performing step 304, the power sourcing equipment may further first determine whether the output power changes of the power supply ports caused by respective load adjustment of the plurality of powered devices are different from each other. Only when determining that the output power changes of the power supply ports caused by respective load adjustment of the plurality of powered devices are different from each other, the power sourcing equipment performs step 304. "Only when" means that when the power sourcing equipment determines that the output power changes of the power sourcing equipment caused by respective load adjustment of the plurality of powered devices are completely the same or partly the same, the power sourcing equipment does not perform the step of sending the plurality of load adjustment indications to the plurality of powered devices. When the output power changes of the power supply ports caused by respective load adjustment of the plurality of powered devices are different from each other, the power sourcing equipment can accurately determine, based on the output power changes of the power supply ports, a first data port and a power supply port that are connected to a same powered device in the plurality of powered devices.

It should be further noted that, after step 301 to step 304 are completed, if connection manners of some first data ports and some power supply ports to the powered devices cannot be clearly determined, it may be because output power changes of some power supply ports cannot be clearly obtained in a load adjustment process, or because same output power changes of a plurality of power supply ports occur. In this case, step 301 to step 304 may be repeatedly performed until the connection manners of all first data ports and all power supply ports to the powered devices are determined.

For ease of understanding, the following uses specific examples to describe the implementation process of the connection manner identification method provided in the embodiments of this application.

In a first example, different load adjustment manners are reflected by a combination of: different load adjustment duration, different load adjustment quantities, and different time intervals for every two adjacent times of load adjustment in a plurality of times of load adjustment. After a plurality of powered devices are connected to power sourcing equipment separately by using power supply cables and data cables, and it is determined that the power sourcing equipment can supply power to all the powered devices by using the power supply cables, and that the power sourcing equipment can perform data communication with all the powered devices, the power sourcing equipment may interact with the powered devices to implement the connection manner identification method provided in the embodiments of this application. An implementation process of the method includes the following steps:

Step S11: Before negotiation loads of the powered devices are adjusted, the power sourcing equipment obtains output powers of all power supply ports of the power sourcing equipment.

For example, it is assumed that the power sourcing equipment has four power supply ports and four first data ports in total. Before the negotiation loads of the powered devices are adjusted, an obtained output power of a power supply port 1 is P1, an obtained output power of a power supply port 2 is P2, an obtained output power of a power supply port 3 is P3, and an obtained output power of a power supply port 4 is P4.

Step S12: The power sourcing equipment sends status maintenance indications to all the powered devices, to indicate all the powered devices to keep their working statuses unchanged in a connection manner identification process.

For an implementation process of step S12, refer to related descriptions in step 301.

Optionally, before sending the status maintenance indications to the powered devices, the power sourcing equipment may first obtain output power change statuses of power supply ports caused by respective negotiation load adjustment of the plurality of powered devices, and when a difference between output power change values of the power supply ports caused by respective negotiation load adjustment of every two of the plurality of powered devices is greater than a difference threshold, send the status maintenance indications to the powered devices.

Step S13: The powered devices control their working statuses to keep unchanged based on the status maintenance indications.

For an implementation process of step S13, refer to related descriptions in step 301.

Step S14: The power sourcing equipment separately sends a plurality of load adjustment indications to the plurality of powered devices by using a plurality of first data ports, where load adjustment manners indicated by the plurality of load adjustment indications are different, and the different load adjustment manners are reflected by a combination of: different load adjustment duration, different load adjustment quantities, and different time intervals for every two adjacent times of load adjustment in a plurality of times of load adjustment.

For an implementation process of step S14, refer to related descriptions in step 301.

For example, it is assumed that there are four powered devices in total connected to the power sourcing equipment, and a load adjustment indication sent by the power sourcing equipment to a powered device 1 by using a first data port 1 indicates that load adjustment duration is 1 second, a load adjustment quantity is 4, and a time interval for every two adjacent times of load adjustment in four times of load adjustment is 1 second. That is, the load adjustment indication indicates the powered device 1 to adjust a load in eight time units based on a permutation and combination of binary numbers 10101010. A load adjustment indication sent by the power sourcing equipment to a powered device 2 by using a first data port 2 indicates that load adjustment duration is 2 seconds, a load adjustment quantity is 2, and a time interval for every two adjacent times of load adjustment in two times of load adjustment is 2 seconds. That is, the load adjustment indication indicates the powered device 2 to adjust a load in eight time units based on a permutation and combination of binary numbers 11001100. A load adjustment indication sent by the power sourcing equipment to a powered device 3 by using a first data port 3 indicates that load adjustment duration is 3 seconds, a load adjustment quantity is 2, and a time interval for every two adjacent times of load adjustment in two times of load adjustment is 3 seconds. That is, the load adjustment indication indicates the powered device 3 to adjust a load in eight time units based on a permutation and combination of binary numbers 11100011. A load adjustment indication sent by the power sourcing equipment to a powered device 4 by using a first data port 4 indicates that load adjustment duration is 4 seconds and a load adjustment quantity is 1. That is, the load adjustment indication indicates the powered device 4 to adjust a load in eight time units based on a permutation and combination of binary numbers 11110000.

Figure 6:
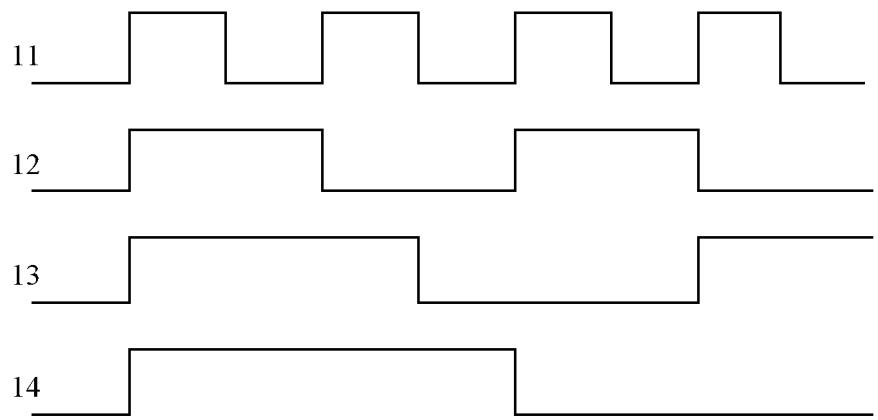
FIG. 6 is a schematic diagram of a load adjustment manner indicated by a load adjustment indication sent by power sourcing equipment according to an embodiment of this application.

When a low level is used to indicate not to adjust a load, and a high level is used to indicate to adjust a load, waveforms of load adjustment of the four powered devices are shown in FIG. 6. A waveform 11 is a change waveform corresponding to the load adjustment indication sent by the power sourcing equipment to the powered device 1 by using the first data port 1, a waveform 12 is a change waveform corresponding to the load adjustment indication sent by the power sourcing equipment to the powered device 2 by using the first data port 2, a waveform 13 is a change waveform corresponding to the load adjustment indication sent by the power sourcing equipment to the powered device 3 by using the first data port 3, and a waveform 14 is a change waveform corresponding to the load adjustment indication sent by the power sourcing equipment to the powered device 4 by using the first data port 4.

Step S15: The plurality of powered devices adjust respective negotiation loads based on the load adjustment indications.

For an implementation process of step S15, refer to the implementation process of step 302. For example, when the negotiation load is disposed in each of the plurality of powered devices, and a connection manner of the negotiation load, a switch, and a powered port is shown in FIG. 4, after receiving the load adjustment indication, each powered device may adjust, based on the load adjustment indication received by the powered device, a connection state between the negotiation load and the powered port by controlling an on/off state of the switch.

Step S16: The power sourcing equipment obtains output power changes of the plurality of power supply ports caused by negotiation load adjustment of the powered devices.

For an implementation process of step S16, refer to the implementation process of step 303.

Figure 7:
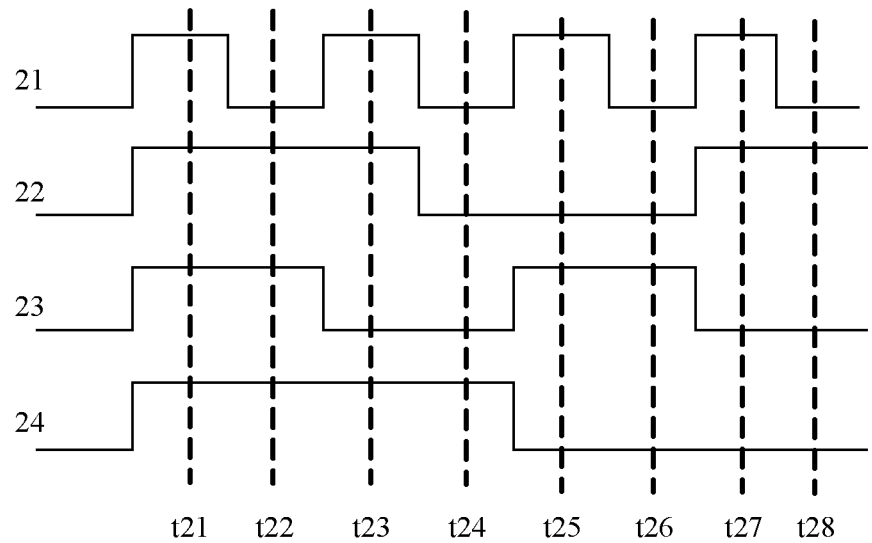
FIG. 7 is a schematic waveform diagram of output powers of a plurality of power supply ports of power sourcing equipment according to an embodiment of this application.

For example, it is assumed that the negotiation loads of the plurality of powered devices are resistors, and resistance values of the resistors of the plurality of powered devices are the same. When the resistor shown in FIG. 4 is connected to a powered port, an output power of a power supply port connected to the powered port by using a power supply cable increases by $\Delta x$. In addition, it is assumed that a basic power of a powered port of each powered device is corresponding to a low level, and an output power obtained after $\Delta x$ is added is corresponding to a high level. Then, waveforms of the output powers of the four power supply ports obtained by the power sourcing equipment are respectively shown in FIG. 7. A waveform 21 is a waveform of the output power of the power supply port 1, a waveform 22 is a waveform of the output power of the power supply port 2, a waveform 23 is a waveform of the output power of the power supply port 3, and a waveform 24 is a waveform of the output power of the power supply port 4. When the waveforms are sampled based on a same sampling period as the waveform 11, a high level is represented by using a binary number 1, and a low level is represented by using a binary number 0, sampling time points of the waveforms are respectively t21, t22, t23, t24, t25, t26, t27, and t28, a binary sequence obtained after sampling for the output power of the power supply port 1 is 10101010, a binary sequence obtained after sampling for the output power of the power supply port 2 is 11100011, a binary sequence obtained after sampling for the output power of the power supply port 3 is 11001100, and a binary sequence obtained after sampling for the output power of the power supply port 4 is 11110000.

Step S17: The power sourcing equipment determines, based on the output power changes, a first data port and a power supply port that are connected to a same powered device in the plurality of powered devices.

For an implementation process of step S17, refer to the implementation process of step 304.

For example, based on the examples in step S16 and step S14, it may be learned that the output power change manner of the power supply port 1 matches the load adjustment manner indicated by the load adjustment indication sent by the first data port 1, the output power change manner of the power supply port 2 matches the load adjustment manner indicated by the load adjustment indication sent by the first data port 3, the output power change manner of the power supply port 3 matches the load adjustment manner indicated by the load adjustment indication sent by the first data port 2, and the output power change manner of the power supply port 4 matches the load adjustment manner indicated by the load adjustment indication sent by the first data port 4. Therefore, it may be determined that the power supply port 1 and the first data port 1 are connected to a same powered device, the power supply port 2 and the first data port 3 are connected to a same powered device, the power supply port 3 and the first data port 2 are connected to a same powered device, and the power supply port 4 and the first data port 4 are connected to a same powered device.

It may be learned from the foregoing that, because the connection manner is identified by using the change trend of the output power in the identification method in the first example, when the load adjustment manners of the plurality of powered devices are different from each other, regardless of whether the negotiation loads of the plurality of powered devices are the same, the connection manners of the power sourcing equipment and the plurality of powered devices can be effectively identified. Therefore, the connection manner identification method in the first example can be applied to various identification scenarios, and has good applicability. In addition, in the connection manner identification method in the first example, the connection manners of the plurality of powered devices can be identified at a time. For example, when a minimum adjustment period for negotiation load adjustment of the plurality of powered devices is a one time unit, connection manners of a maximum of $2^n$ powered devices can be identified at a time within n time units in this method. Therefore, identification efficiency of this connection manner identification method is relatively high.

In a second example, different load adjustment manners are reflected by different magnitudes of output power changes caused by load adjustment. After a plurality of powered devices are connected to power sourcing equipment separately by using power supply cables and data cables, and it is determined that the power sourcing equipment can supply power to all the powered devices by using the power supply cables, and that the power sourcing equipment can perform data communication with all the powered devices, the power sourcing equipment may interact with the powered devices to implement the connection manner identification method provided in the embodiments of this application. The implementation process of the method includes the following steps:

Step S21: Before negotiation loads of the powered devices are adjusted, the power sourcing equipment obtains output powers of all power supply ports of the power sourcing equipment.

For example, it is assumed that the power sourcing equipment has four power supply ports and four data ports in total. Before the negotiation loads of the powered devices are adjusted, an obtained output power of a power supply port 1 is P1, an obtained output power of a power supply port 2 is P2, an obtained output power of a power supply port 3 is P3, and an obtained output power of a power supply port 4 is P4.

Step S22: The power sourcing equipment obtains output power changes of the power supply ports caused by respective negotiation load adjustment of the plurality of powered devices, and determines whether the output power changes of the power supply ports caused by respective negotiation load adjustment of the plurality of powered devices are different from each other.

For an implementation process of step S22, refer to related descriptions in step 301. Details are not described herein again.

Step S23: When the output power changes of the power supply ports caused by respective negotiation load adjustment of the plurality of powered devices are different from each other, the power sourcing equipment sends status maintenance indications to all the powered devices, to indicate the plurality of powered devices to keep their working statuses unchanged in a connection manner identification process.

For an implementation process of step S23, refer to related descriptions in step 301.

Step S24: The powered devices control their working statuses to keep unchanged based on the status maintenance indications.

For an implementation process of step S24, refer to related descriptions in step 30.

Step S25: The power sourcing equipment separately sends a plurality of load adjustment indications to the plurality of powered devices by using a plurality of data ports, where the plurality of load adjustment indications indicate different load adjustment manners, and different load adjustment manners are reflected by different amplitudes of output power changes caused by load adjustment.

For an implementation process of step S25, refer to related descriptions in step 30.

For example, it is assumed that there are four powered devices in total connected to the power sourcing equipment, a load adjustment indication sent by the power sourcing equipment to a powered device 1 by using a first data port 1 indicates that an output power change amplitude caused by load adjustment is x1, a load adjustment indication sent by the power sourcing equipment to a powered device 2 by using a first data port 2 indicates that an output power change amplitude caused by load adjustment is x2, a load adjustment indication sent by the power sourcing equipment to a powered device 3 by using a first data port 3 indicates that an output power change amplitude caused by load adjustment is x3, and a load adjustment indication sent by the power sourcing equipment to a powered device 4 by using a first data port 4 indicates that an output power change amplitude caused by load adjustment is x4.

Step S26: The plurality of powered devices adjust respective negotiation loads based on the load adjustment indications.

For an implementation process of step S26, refer to the implementation process of step 302.

Step S27: The power sourcing equipment obtains output power changes of the plurality of power supply ports caused by negotiation load adjustment of the powered devices.

For an implementation process of step S27, refer to the implementation process of step 303.

For example, it is assumed that an output power change amplitude of the power supply port 1 caused by negotiation load adjustment of the powered device is x1, an output power change amplitude of the power supply port 2 caused by negotiation load adjustment of the powered device is x3, an output power change amplitude of the power supply port 3 caused by negotiation load adjustment of the powered device is x2, and an output power change amplitude of the power supply port 4 caused by negotiation load adjustment of the powered device is x4.

Step S28: The power sourcing equipment determines, based on the output power changes, a first data port and a power supply port that are connected to a same powered device in the plurality of powered devices.

For an implementation process of step S28, refer to the implementation process of step 304.

For example, based on the examples in step S27 and step S25, it may be learned that the output power change amplitude of the power supply port 1 is the same as an output power change amplitude indicated by the load adjustment indication sent by the first data port 1, the output power change amplitude of the power supply port 2 is the same as an output power change amplitude indicated by the load adjustment indication sent by the first data port 3, the output power change amplitude of the power supply port 3 is the same as an output power change amplitude indicated by the load adjustment indication sent by the first data port 2, and the output power change amplitude of the power supply port 4 is the same as an output power change amplitude indicated by the load adjustment indication sent by the first data port 4. Therefore, it may be determined that the power supply port 1 and the first data port 1 are connected to a same powered device, the power supply port 2 and the first data port 3 are connected to a same powered device, the power supply port 3 and the first data port 2 are connected to a same powered device, and the power supply port 4 and the first data port 4 are connected to a same powered device.

In a third example, power sourcing equipment sequentially sends a plurality of load adjustment indications to a plurality of powered devices. After a plurality of powered devices are connected to power sourcing equipment separately by using power supply cables and data cables, and it is determined that the power sourcing equipment can supply power to all the powered devices by using the power supply cables, and that the power sourcing equipment can perform data communication with all the powered devices, the power sourcing equipment may interact with the powered devices to implement the connection manner identification method provided in the embodiments of this application. An implementation process of the method includes the following steps:

Step S31: Before negotiation loads of the powered devices are adjusted, the power sourcing equipment obtains output powers of all power supply ports of the power sourcing equipment.

For example, it is assumed that the power sourcing equipment has four power supply ports and four data ports in total. Before the negotiation loads of the powered devices are adjusted, an obtained output power of a power supply port 1 is P1, an obtained output power of a power supply port 2 is P2, an obtained output power of a power supply port 3 is P3, and an obtained output power of a power supply port 4 is P4.

Step S32: The power sourcing equipment sends status maintenance indications to all the powered devices, to indicate the plurality of powered devices to keep their working statuses unchanged in a connection manner identification process.

For an implementation process of step S32, refer to related descriptions in step 301.

Step S33: The powered devices control their working statuses to keep unchanged based on the status maintenance indications.

For an implementation process of step S33, refer to related descriptions in step 301.

Step S34: The power sourcing equipment sends, by using one data cable of a plurality of data cables, a load adjustment indication to a powered device connected to the power sourcing equipment through the data cable.

For an implementation process of step S34, refer to related descriptions in step 301.

For example, it is assumed that there are four powered devices in total connected to the power sourcing equipment, and the power sourcing equipment sends a load adjustment indication to a powered device 1 by using a data port 1.

Step S35: The powered device that receives the load adjustment indication adjusts its negotiation load based on the load adjustment indication.

For an implementation process of step S35, refer to the implementation process of step 302.

Step S36: The power sourcing equipment obtains output power changes of the plurality of power supply ports caused by negotiation load adjustment of the powered devices.

For an implementation process of step S36, refer to the implementation process of step 303.

For example, it is assumed that the output power of the power supply port 1 changes caused by negotiation load adjustment of the powered device, and neither of the output powers of the power supply port 2 to the power supply port 4 changes.

Step S37: The power sourcing equipment determines, based on the output power changes, a first data port and a power supply port that are connected to a same powered device in the plurality of powered devices.

For an implementation process of step S37, refer to the implementation process of step 304.

For example, based on the examples in step S36 and step S34, it may be learned that when the load adjustment indication is sent to the powered device by using the first data port 1, the output power of the power supply port 1 changes, and the output powers of the other power supply ports do not change. Therefore, an output power change amplitude of the power supply port 1 matches an output power change indicated by the load adjustment indication sent by using the first data port 1. Therefore, it may be determined that the power supply port 1 and the first data port 1 are connected to a same powered device.

Step S34 to step S37 are separately repeated for another data cable, until the powered devices connected to all the first data ports and all the power supply ports are determined.

In conclusion, the embodiment of this application provides the connection manner identification method. The power sourcing equipment separately sends the plurality of load adjustment indications to the plurality of powered devices by using the plurality of data ports. After the powered device adjusts the negotiation load of the powered device based on the indication of the power sourcing equipment, because the negotiation load changes a power of the powered device, and an output power of a power supply port connected to the powered device by using a power supply cable also changes, the power sourcing equipment can determine, based on the output power change, a data port and a power supply port that are connected to a same powered device. This implements identification of a data port and a power supply port that are connected to a same powered device. In addition, because the connection manner identification method can be automatically performed, identification efficiency and accuracy can be effectively ensured. In addition, the method can be implemented automatically. Therefore, management personnel can remotely control performing of the method, and check whether a connection manner is correct based on the method, thereby improving flexibility of managing the power sourcing equipment and the powered device.

It should be noted that a chronological order of steps of the connection manner provided in the embodiments of this application may be properly adjusted, and the steps may also be correspondingly added or deleted according to a situation. Any variation readily figured out by persons skilled in the art within the technical scope disclosed in this application shall fall within the protection scope of this application, and details are not described herein again.

The following describes apparatus embodiments of this application, and the apparatus embodiments may be used to execute the method embodiments of this application. For details not disclosed in the apparatus embodiments of this application, refer to the method embodiments of this application.

Figure 8:
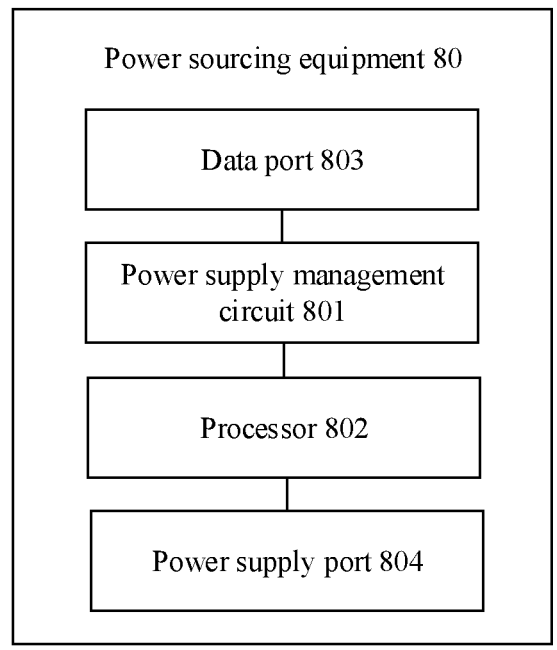
FIG. 8 is a schematic structural diagram of power sourcing equipment according to an embodiment of this application.

An embodiment of this application provides power sourcing equipment. As shown in FIG. 8, the power sourcing equipment 80 may include a power supply management circuit 801, a processor 802, a plurality of data ports 803, and a plurality of power supply ports 804. A plurality of powered devices are separately connected to the plurality of power supply ports 804 by using a plurality of power supply cables, and the plurality of powered devices are separately connected to the plurality of data ports 803 by using a plurality of data cables. A data signal is transmitted between the power sourcing equipment 80 and the powered device by using the data cable. The power sourcing equipment 80 supplies power to the powered device by using the power supply cable. Optionally, the data cable may be an optical fiber, and the power supply cable may be any cable that can supply power, such as a copper cable (including two or more copper wires). In addition, when the data cable is an optical fiber, the data cable and the power supply cable may be located in a photoelectric composite cable.

The power supply management circuit 801 is configured to supply power to the plurality of powered devices, and obtain output powers of the power supply ports. Optionally, the power supply management circuit 801 may be a power sourcing equipment chip.

The processor 802 is configured to separately send a plurality of load adjustment indications to the plurality of powered devices by using the plurality of data ports. Each load adjustment indication in the plurality of load adjustment indications indicates a corresponding powered device to adjust a load.

Optionally, the power sourcing equipment may further include a first communications component. The first communications component is configured to be responsible for receiving and sending a data signal of the power sourcing equipment 80. Correspondingly, the processor 802 may send the load adjustment indication by using the first communications component. Optionally, the first communications component may be a physical interface transceiver (phy) chip.

The processor 802 is further configured to obtain, from the power supply management circuit 801, output power changes of the plurality of power supply ports 804 caused by load adjustment of the powered devices.

The processor 802 is further configured to determine, based on the output power changes, a data port 803 and a power supply port 804 that are connected to a same powered device in the plurality of powered devices. Optionally, the processor 802 may be a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. Alternatively, the processor 802 may be a general purpose processor, such as a central processing unit (CPU), a network processor (NP), or a combination of a CPU and an NP.

Optionally, load adjustment manners indicated by the plurality of load adjustment indications are different from each other.

In an implementation, the processor 802 is specifically configured to simultaneously send the plurality of load adjustment indications. When the power sourcing equipment 80 simultaneously sends the plurality of load adjustment indications, the power sourcing equipment 80 may send the load adjustment indications to the plurality of powered devices at a time. This reduces a total time consumed for sending the plurality of load adjustment indications, shortens a time of identifying connection manners of the plurality of powered devices, and improves identification efficiency.

That the load adjustment manners are different may be reflected by one or a combination of the following: load adjustment start time points are different, load adjustment duration is different, quantities of load adjustment times are different, time intervals for every two adjacent times of load adjustment in a plurality of times of load adjustment are different, and amplitudes of output power changes caused by load adjustment are different.

Optionally, that the plurality of load adjustment indications are different may be represented as follows: M load adjustment indications indicate to perform, in a connection manner identification process within duration of n time units, load adjustment based on load adjustment manners indicated by M permutations and combinations in $2^n$ permutations and combinations of n bits of binary numbers. An $i^{th}$-bit binary number in the permutation and combination indicates a load adjustment status in an $i^{th}$ time unit in the n time units, a binary number 0 in the permutation and combination indicates not to adjust a load, a binary number 1 in the permutation and combination indicates to adjust a load, and M is less than or equal to $2^n$.

In another implementation, the processor 802 is specifically configured to sequentially send the plurality of load adjustment indications. Correspondingly, the processor 802 is further configured to: after sending a load adjustment indication to a first powered device by using a data port 803, determine that a power supply port 804 whose output power changes and the data port 803 that sends the load adjustment indication are connected to the first powered device, where the first powered device is any one of the plurality of powered devices.

When the load adjustment manners indicated by the plurality of load adjustment indications are different from each other, the processor 802 is specifically configured to: when an output power change manner of a first power supply port 804 matches a load adjustment manner indicated by a load adjustment indication sent by using a first data port 803, determine that the first power supply port 804 and the first data port 803 are connected to a same powered device, where the first power supply port 804 is any one of the plurality of power supply ports 804, and the first data port 803 is one of the plurality of data ports 803.

Specifically, in the connection manner identification process within the duration of n time units, when a binary sequence determined based on an output power of the first power supply port is the same as a permutation and combination of the load adjustment manner indicated by the load adjustment indication sent by using the first data port, it is determined that the output power change manner of the first power supply port matches the load adjustment manner indicated by the load adjustment indication sent by using the first data port. A $j^{th}$-bit binary number in the binary sequence indicates an output power change status of the first power supply port in a $j^{th}$ time unit in the n time units, a binary number 0 in the binary sequence indicates that an output power is unchanged, and a binary number 1 in the binary sequence indicates that an output power is changed. The permutation and combination consists of a binary number 0 and a binary number 1, an $i^{th}$-bit binary number in the permutation and combination indicates a load adjustment status in an $i^{th}$ time unit in the n time units, a binary number 0 in the permutation and combination indicates not to adjust a load, and a binary number 1 in the permutation and combination of the binary numbers indicates to adjust a load.

Optionally, the processor 802 is specifically configured to: determine whether the output power changes caused by respective load adjustment of the plurality of powered devices are different from each other; and only when the output power changes caused by respective load adjustment of the plurality of powered devices are different from each other, determine, based on the output power changes, a data port 803 and a power supply port 804 that are connected to a same powered device in the plurality of powered devices.

When the output power changes caused by respective load adjustment of the plurality of powered devices are different from each other, in the connection manner identification process, the output power changes of the power supply ports 804 of the power sourcing equipment 80 caused by negotiation load adjustment of the powered devices are different, so that the power sourcing equipment 80 can more accurately determine, based on the output power changes of the power supply ports 804, a data port 803 and a power supply port 804 that are connected to a same powered device in the plurality of powered devices.

In addition, the processor 802 is further configured to: separately send status maintenance indications to the plurality of powered devices by using the plurality of data ports 803, where the status maintenance indications indicate the plurality of powered devices to keep their working statuses unchanged in a connection manner identification process.

In another implementation, the load adjustment indications further indicate the plurality of powered devices to keep their working statuses unchanged in a connection manner identification process.

When the powered device keeps its working status in the connection manner identification process, a change amount of a power consumed by the powered device in the process does not include a change amount caused by a change of the working status, so that the change amount is mainly a power change caused by an operation required in the connection manner identification process. Therefore, a drawing power change of the powered device caused by factors such as adjustment of the working status can be excluded, and impact of factors such as adjustment of the working status on a result of identifying the connection manner can be eliminated. This ensures accuracy of identifying the connection manner.

In conclusion, this embodiment of this application provides the power sourcing equipment. The power sourcing equipment separately sends the plurality of load adjustment indications to the plurality of powered devices by using the plurality of data ports. After the powered device adjusts the negotiation load of the powered device based on the indication of the power sourcing equipment, because the negotiation load changes a power of the powered device, and an output power of a power supply port connected to the powered device by using a power supply cable also changes, the power sourcing equipment can determine, based on the output power change, a data port and a power supply port that are connected to a same powered device. This implements identification of a data port and a power supply port that are connected to a same powered device. In addition, because the power sourcing equipment can automatically perform the foregoing connection manner identification process, identification efficiency and accuracy can be effectively ensured. In addition, because the power sourcing equipment can automatically perform the foregoing connection manner identification process, management personnel can remotely control performing of the connection manner identification process, and check, based on the process, whether the connection manner is correct. This improves flexibility of managing the power sourcing equipment and the powered device.

Figure 9:
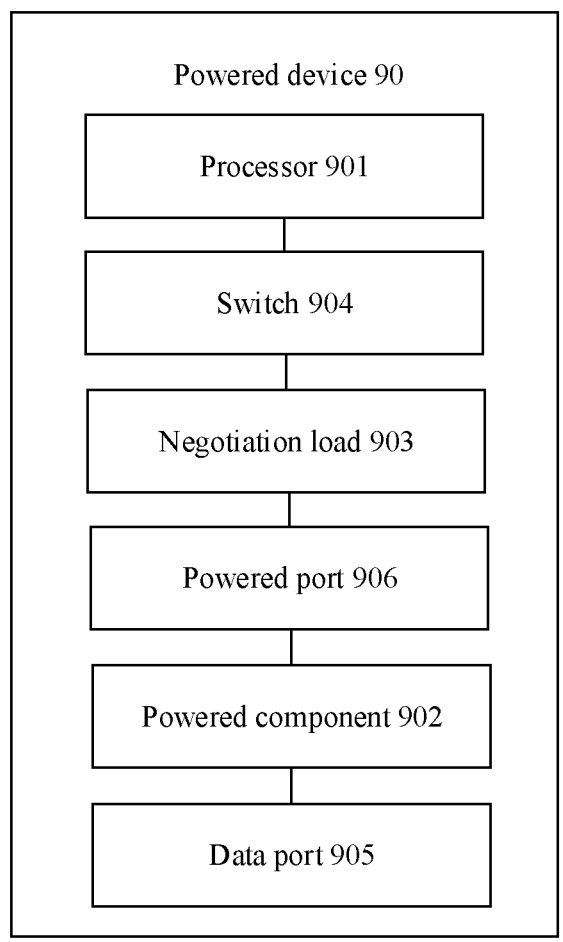
FIG. 9 is a schematic structural diagram of a powered device according to an embodiment of this application.

An embodiment of this application provides a powered device. As shown in FIG. 9, the powered device 90 includes a processor 901, a powered component 902, a negotiation load 903, a switch 904, a data port 905, and a powered port 906. The switch 904 is connected to the powered port and the negotiation load 903. For a connection manner, refer to the connection manner provided in the foregoing method embodiment. The powered port 906 is connected to a power supply port of power sourcing equipment by using a power supply cable, and the data port 905 is connected to a first data port of the power sourcing equipment by using a data cable. A data signal is transmitted between the power sourcing equipment and the powered device by using the data cable. The power sourcing equipment supplies power to the powered device by using the power supply cable.

Optionally, the data cable may be an optical fiber, and the power supply cable may be any cable that can supply power, such as a copper cable (including two or more copper wires). In addition, when the data cable is an optical fiber, the data cable and the power supply cable may be located in a photoelectric composite cable.

The negotiation load 903 may be a resistor.

The powered component 902 is powered by the power sourcing equipment. The powered component 902 is a power-consumed component in the powered device, such as a wireless local area network (WLAN) module. Optionally, the powered component 902 may be a powered device chip.

The processor 901 is configured to receive a load adjustment indication sent by the power sourcing equipment by using a data port, where the load adjustment indication indicates the powered device 90 to adjust a load.

Optionally, the powered device 90 may further include a second communications component. Specifically, the second communications component is configured to be responsible for receiving and sending a data signal of the powered device. Optionally, the second communications component may be a phy chip.

The processor 901 is further configured to adjust an on/off state of the switch 904 based on the load adjustment indication, to adjust an impact status of the negotiation load 903 on a drawing power of the powered port. The powered device 90 may further include a switch drive circuit. The processor 901 may send an indication to the switch drive circuit, to indicate the switch drive circuit to control the on/off state of the switch. It should be noted that, adjusting the load of the powered device 90 by controlling the on/off state of the switch 904 is an example of an implementation of adjusting the load of the powered device 90, and another implementation is not limited. For example, a variable resistor may further be disposed in the powered device 90, and the processor 901 may control adjustment on a resistance value of the variable resistor, to implement load adjustment of the powered device 90.

Optionally, the processor 901 may be a hardware chip. The hardware chip may be an ASIC, a PLD, or a combination thereof. The PLD may be a CPLD, an FPGA, a GAL, or any combination thereof. Alternatively, the processor 901 may be a general purpose processor, such as a CPU, an NP, or a combination of a CPU and an NP.

In conclusion, this embodiment of this application provides the powered device. After receiving the load adjustment indication sent by the power sourcing equipment by using the data port, the powered device adjusts the negotiation load of the powered device based on the indication of the power sourcing equipment. Because the negotiation load changes a power of the powered device, and an output power of a power supply port connected to the powered device by using a power supply cable also changes, the power sourcing equipment can determine, based on the output power change, a first data port and a power supply port that are connected to a same powered device. This implements identification of a first data port and a power supply port that are connected to a same powered device. In addition, because the powered device can automatically perform the foregoing connection manner identification process, identification efficiency and accuracy can be effectively ensured. In addition, because the powered device can automatically perform the foregoing connection manner identification process, management personnel can remotely control performing of the connection manner identification process, and check, based on the process, whether the connection manner is correct. This improves flexibility of managing the power sourcing equipment and the powered device.

It may be clearly understood by a person skilled in the art that, for the purpose of convenient and brief description, for a detailed working process of the foregoing power sourcing equipment and powered device, refer to a corresponding process in the foregoing method embodiments. Details are not described herein again.

An embodiment of this application further provides a computer readable storage medium. The computer readable storage medium may be a non-transient readable storage medium. When instructions in the computer readable storage medium are executed by a computer, the computer is configured to implement the function of the power sourcing equipment in the connection manner identification method provided in this application. The computer readable storage medium includes but is not limited to a volatile memory such as a random access memory, and a non-volatile memory such as a flash memory, a hard disk drive (HDD), or a solid-state drive (SSD).

An embodiment of this application further provides another computer readable storage medium. The computer readable storage medium may be a non-transient readable storage medium. When instructions in the computer readable storage medium are executed by a computer, the computer is configured to implement the function of the powered device in the connection manner identification method provided in this application. The computer readable storage medium includes but is not limited to a volatile memory such as a random access memory, and a non-volatile memory such as a flash memory, a hard disk drive, or a solid state drive.

This application further provides a computer program product. The computer program product includes computer instructions. When the computer instructions are executed by a computing device, the computing device performs the function of the power sourcing equipment in the connection manner identification method provided in this application.

This application further provides another computer program product. The computer program product includes computer instructions. When the computer instructions are executed by a computing device, the computing device performs the function of the powered device in the connection manner identification method provided in this application.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely optional embodiments of this application, but are not intended to limit this application. Any modification, equivalent replacement, or improvement made without departing from the principle of this application should fall within the protection scope of this application.

What is claimed is:

1. A method implemented by power sourcing equipment, the method comprising:
    separately sending a plurality of load adjustment indications to a plurality of powered devices by using a plurality of data ports, wherein each load adjustment indication instructs one of the powered devices to perform a load adjustment, wherein a plurality of power supply ports of the power sourcing equipment are configured to connect to the powered devices by using a plurality of power supply cables, and wherein the data ports are configured to connect to the powered devices by using a plurality of data cables;
    obtaining output power changes of power supply ports caused by load adjustment of the powered devices; and
    identifying, based on a binary sequence of output power from one of the power supply ports matching one of the load adjustment indications from one of the data ports, that the one of the data ports and the one of the power supply ports are connected to a same one of the powered devices.

2. The method of claim 1, wherein the load adjustment indications comprise a plurality of load adjustment manners, and wherein the load adjustment manners are different from each other.

3. The method of claim 2, wherein the power sourcing equipment simultaneously sends the load adjustment indications.

4. The method of claim 1, wherein the power sourcing equipment sequentially sends the load adjustment indications.

5. The method of claim 2, wherein the load adjustment manners comprise one or more of different load adjustment start time points, different load adjustment durations, different quantities of load adjustment times, different time intervals for adjacent load adjustment times, or different amplitudes of the output power changes.

6. The method of claim 2, further comprising performing the method within a duration of n time units, wherein M load adjustment indications instruct to perform load adjustment based on load adjustment manners indicated by M permutations and combinations in $2^n$ permutations and combinations of n bits of binary numbers, wherein an $i^{th}$-bit binary number in the permutation and combination indicates a load adjustment status in an $i^{th}$ time unit in the n time units, wherein one binary number in the permutation and combination indicates to not adjust a load, wherein the other binary number in the permutation and combination indicates to adjust the load, and wherein M is less than or equal to $2^n$.

7. The method of claim 4, further comprising identifying, after the one of the data ports sends one of the load adjustment indications, that the one of the data ports and the one of the power supply ports are connected to the same one of the powered devices when output power of the one of the power supply ports changes.

8. The method of claim 2, further comprising identifying, after the one of the data ports sends one of the load adjustment indications, that the one of the data ports and the one of the power supply ports are connected to the same one of the powered devices when an output power change manner of the one of the power supply ports matches a load adjustment manner indicated by the one of the load adjustment indications.

9. The method of claim 8, further comprising performing the method within a duration of n time units, wherein the method further comprises identifying that the one of the data ports and the one of the power supply ports are connected to the same one of the powered devices when the binary sequence is the same as a permutation and combination of the one of the load adjustment manners indicated by the one of the load adjustment indications from the one of the data ports, wherein a $j^{th}$-bit binary number in the binary sequence indicates an output power change status of the one of the power supply ports in a $j^{th}$ time unit in the n time units, wherein one binary number in the binary sequence indicates that an output power is unchanged, wherein the other binary number in the binary sequence indicates that the output power is changed, wherein the permutation and combination comprises a binary number 0 and a binary number 1, wherein an $i^{th}$-bit binary number in the permutation and combination indicates a load adjustment status in an $i^{th}$ time unit in the n time units, wherein one binary number in the permutation and combination indicates to not adjust a load, and wherein the other binary number in the permutation and combination of the binary numbers indicates to adjust the load.

10. The method of claim 2, further comprising:
identifying whether the output power changes are different from each other; and
identifying, based on the output power changes and only when the output power changes are different from each other, that the one of the data ports and the one of the power supply ports are connected to the same one of the powered devices.

11. The method of claim 1, wherein the powered devices comprise working statuses, wherein the method further comprises separately sending status maintenance indications to the powered devices by using the data ports, and wherein the status maintenance indications instruct the powered devices to maintain the working statuses in the method.

12. The method of claim 1, wherein the powered devices comprise working statuses, and wherein the load adjustment indications further instruct the powered devices to maintain the working statuses in the method.

13. The method of claim 1, wherein the data cables comprise an optical fiber.

14. The method of claim 13, wherein the data cables and the power supply cables are in an optoelectronic composite cable.

15. Power sourcing equipment, comprising:
a plurality of data ports configured to be connected to powered devices using data cables;
a plurality of power supply ports configured to be connected to the powered devices using power supply cables;
a power supply management circuit configured send output power changes of the power supply ports from a load adjustment of the powered devices; and
one or more processors communicatively connected to the data ports, the power supply ports, and the power supply management circuit and configured to:
separately send a plurality of load adjustment indications to the powered devices by using the data ports, wherein each load adjustment indication instructs one of the powered devices to perform the load adjustment;
obtain, from the power supply management circuit, output power changes caused by the load adjustment of the powered devices; and
identify, based on a binary sequence of output power from one of the power supply ports matching one of the load adjustment indications from one of the data ports, that the one of the data ports and the one of the power supply ports are connected to a same one of the powered devices.

16. The power sourcing equipment of claim 15, wherein the load adjustment indications indicate a plurality of load adjustment manners, and wherein the load adjustment manners are different from each other.

17. The power sourcing equipment of claim 16, wherein the one or more processors are further configured to simultaneously send the load adjustment indications.

18. The power sourcing equipment of claim 16, wherein the load adjustment manners comprise one or more of different load adjustment start time points, different load adjustment durations, different quantities of load adjustment times, different time intervals for adjacent load adjustment times, or different amplitudes of the output power changes.

19. A method implemented by power sourcing equipment, the method comprising:
separately sending a plurality of load adjustment indications to a plurality of powered devices by using a plurality of data ports, wherein the load adjustment indications comprise a plurality of load adjustment manners, wherein the load adjustment manners are different from each other, wherein each load adjustment indication instructs one of the powered devices to perform a load adjustment, wherein a plurality of power supply ports of the power sourcing equipment are configured to connect to the powered devices by using a plurality of power supply cables, and wherein the data ports are configured to connect to the powered devices by using a plurality of data cables;
obtaining output power changes of power supply ports caused by load adjustment of the powered devices;
identifying, based on the output power changes, one of the data ports and one of the power supply ports that are connected to a same one of the powered devices; and
performing the method within a duration of n time units, wherein M load adjustment indications instruct to perform load adjustment based on load adjustment manners indicated by M permutations and combinations in $2^n$ permutations and combinations of n bits of binary numbers, wherein an $i^{th}$-bit binary number in the permutation and combination indicates a load adjustment status in an $i^{th}$ time unit in the n time units, wherein one binary number in the permutation and combination indicates to not adjust a load, wherein the other binary number in the permutation and combination indicates to adjust the load, and wherein M is less than or equal to $2^n$.

20. A method implemented by power sourcing equipment, the method comprising:
separately sending a plurality of load adjustment indications to a plurality of powered devices by using a plurality of data ports, wherein the load adjustment indications comprise a plurality of load adjustment manners, wherein the load adjustment manners are different from each other, wherein each load adjustment indication instructs one of the powered devices to perform a load adjustment, wherein a plurality of power supply ports of the power sourcing equipment are configured to connect to the powered devices by using a plurality of power supply cables, and wherein the data ports are configured to connect to the powered devices by using a plurality of data cables;
obtaining output power changes of power supply ports caused by load adjustment of the powered devices;
identifying, based on the output power changes, one of the data ports and one of the power supply ports that are connected to a same one of the powered devices;
identifying, after the one of the data ports sends one of the load adjustment indications, that the one of the data ports and the one of the power supply ports are connected to the same one of the powered devices when an output power change manner of the one of the power supply ports matches a load adjustment manner indicated by the one of the load adjustment indications; and
performing the method within a duration of n time units, wherein the method further comprises identifying that the one of the data ports and the one of the power supply ports are connected to the same one of the powered devices when a binary sequence identified based on an output power of the one of the power supply ports is the same as a permutation and combination of one of the load adjustment manners indicated by the one of the load adjustment indications from the one of the data ports, wherein a $j^{th}$-bit binary number in the binary sequence indicates an output power change status of the one of the power supply ports in a $j^{th}$ time unit in the n time units, wherein one binary number in the binary sequence indicates that an output power is unchanged, wherein the other binary number in the binary sequence indicates that the output power is changed, wherein the permutation and combination comprises a binary number 0 and a binary number 1, wherein an $i^{th}$-bit binary number in the permutation and combination indicates a load adjustment status in an $i^{th}$ time unit in the n time units, wherein one binary number in the permutation and combination indicates to not adjust a load, and wherein the other binary number in the permutation and combination of the binary numbers indicates to adjust the load.

\* \* \* \* \*